United States Patent
Huang

(10) Patent No.: US 9,057,866 B2
(45) Date of Patent: Jun. 16, 2015

(54) MOBILE DEVICE AND OPTICAL IMAGING LENS THEREOF

(71) Applicants: GeniuS Electronic Optical Co., Ltd., Taichung (TW); OPTO OPTICS CORP., Taipei (TW)

(72) Inventor: Jih-Chung Huang, New Taipei (TW)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 13/847,466

(22) Filed: Mar. 19, 2013

(65) Prior Publication Data

US 2014/0184900 A1 Jul. 3, 2014

(30) Foreign Application Priority Data

Dec. 28, 2012 (TW) .............................. 101151137 A

(51) Int. Cl.
| G02B 13/18 | (2006.01) |
| G02B 9/34  | (2006.01) |
| G02B 13/00 | (2006.01) |

(52) U.S. Cl.
CPC .......... *G02B 13/004* (2013.01); *G02B 13/0015* (2013.01); *G02B 9/34* (2013.01); *G02B 13/18* (2013.01)

(58) Field of Classification Search
CPC ............ G02B 9/00; G02B 9/34; G02B 13/00; G02B 13/001; G02B 13/0015; G02B 13/004
USPC ......................................... 359/715, 771–775
See application file for complete search history.

(56) References Cited

U.S. PATENT DOCUMENTS

| 6,744,570 B1* | 6/2004 | Isono ............................. 359/772 |
| 7,012,765 B2 | 3/2006 | Matsui et al. |
| 7,295,386 B2 | 11/2007 | Taniyama |
| 7,345,830 B2 | 3/2008 | Shinohara |
| 7,375,903 B2 | 5/2008 | Taniyama |
| 7,446,954 B2* | 11/2008 | Sun ................................ 359/773 |
| 7,535,658 B2 | 5/2009 | Taniyama |
| 7,692,877 B2 | 4/2010 | Tang et al. |
| 7,715,119 B2 | 5/2010 | Taniyama |
| 7,755,853 B2 | 7/2010 | Taniyama |
| 8,068,290 B1 | 11/2011 | Tsai et al. |
| 8,089,704 B2 | 1/2012 | Tang et al. |
| 8,179,470 B2 | 5/2012 | Chen et al. |
| 8,253,843 B2 | 8/2012 | Lin |
| 8,422,146 B1* | 4/2013 | Tsai et al. ..................... 359/715 |
| 2005/0105194 A1* | 5/2005 | Matsui et al. ................. 359/772 |
| 2010/0033616 A1 | 2/2010 | Huang et al. |
| 2011/0058089 A1* | 3/2011 | Tang et al. ..................... 348/340 |

(Continued)

FOREIGN PATENT DOCUMENTS

| CN | 1864087 | 11/2006 |
| CN | 101644811 | 2/2010 |

(Continued)

*Primary Examiner* — Thong Nguyen
(74) *Attorney, Agent, or Firm* — Baker & McKenzie LLP

(57) ABSTRACT

Present embodiments provide for a mobile device and an optical imaging lens thereof. The optical imaging lens comprises four lens elements positioned sequentially from an object side to an image side. Through controlling the convex or concave shape of the surfaces and/or the refractive power of the lens elements, the optical imaging lens shows better optical characteristics and the total length of the optical imaging lens is shortened.

14 Claims, 30 Drawing Sheets

(56) References Cited

U.S. PATENT DOCUMENTS

| | | |
|---|---|---|
| 2011/0157453 A1 | 6/2011 | Chen et al. |
| 2011/0188132 A1 | 8/2011 | Yamakawa |
| 2011/0188133 A1 | 8/2011 | Yamakawa |
| 2011/0242683 A1 | 10/2011 | Yamakawa |
| 2011/0299178 A1 | 12/2011 | Kitahara |
| 2012/0013998 A1 | 1/2012 | Tang et al. |
| 2012/0069449 A1 | 3/2012 | Taniyama |
| 2012/0113529 A1* | 5/2012 | Ko ................................ 359/715 |
| 2013/0188264 A1* | 7/2013 | Hashimoto ................... 359/715 |
| 2014/0055870 A1* | 2/2014 | Chang et al. ................. 359/715 |

FOREIGN PATENT DOCUMENTS

| | | |
|---|---|---|
| CN | 102081220 | 6/2011 |
| CN | 102466866 | 5/2012 |
| EP | 2110695 A1 | 10/2009 |
| JP | 2011064989 | 3/2011 |
| JP | 2009162810 | 3/2012 |
| JP | 2012042840 | 3/2012 |
| JP | 2012068292 | 4/2012 |
| KR | 20120057705 | 6/2012 |
| WO | 2010010891 | 1/2010 |
| WO | 2011027690 | 3/2011 |

\* cited by examiner

| f(Focus)= 1.814 mm, HFOV(Half angular field of view)= 34.286 deg., Total length of system= 2.345mm, Fno= 2.8, Image hieght= 1.235mm ||||||||
|---|---|---|---|---|---|---|---|
| Surface # | | Radius | Thickness | Refractive index | Abbe number | Focus | Material |
| - | Object | ∞ | ∞ | | | | |
| 100 | Aperture stop | ∞ | -0.050 | | | | |
| 111 | 1st lens element | 0.960 | 0.407 | 1.545 | 55.93 | 1.051 | plastic |
| 112 | | -1.218 | 0.129 | | | | |
| 121 | 2nd lens element | -0.417 | 0.246 | 1.637 | 23.231 | -3.522 | plastic |
| 122 | | -0.630 | 0.253 | | | | |
| 131 | 3rd lens element | -1.189 | 0.313 | 1.545 | 55.93 | 1.55 | plastic |
| 132 | | -0.541 | 0.156 | | | | |
| 141 | 4th lens element | -1.579 | 0.250 | 1.532 | 56.064 | -1.001 | plastic |
| 142 | | 0.852 | 0.179 | | | | |
| 151 | IR cut filter | ∞ | 0.210 | | | | |
| 152 | | ∞ | 0.201 | | | | |
| 160 | Image plane | ∞ | | | | | |

FIG.4

| Aspherical parameters ||||| 
|---|---|---|---|---|
| Surface # | 111 | 112 | 121 | 122 |
| K | -7.14E-01 | -9.97E-01 | -1.54E+00 | -1.05E+00 |
| $a_4$ | -3.79E-01 | -2.26E+00 | -2.01E+00 | 8.97E-01 |
| $a_6$ | -3.72E+00 | 1.85E+00 | 1.88E+01 | 6.96E+00 |
| $a_8$ | 2.03E+01 | 1.37E+00 | -8.12E+01 | -3.65E+01 |
| $a_{10}$ | 4.90E+01 | -6.71E+01 | 4.20E+01 | 3.01E+01 |
| $a_{12}$ | -1.82E+03 | -1.22E+02 | 6.81E+02 | 1.00E+02 |
| $a_{14}$ | | | | |
| $a_{16}$ | | | | |
| Surface # | 131 | 132 | 141 | 142 |
| K | -5.27E+00 | -5.01E+00 | 1.43E-01 | -2.66E+01 |
| $a_4$ | 1.55E+00 | 5.93E-01 | -2.87E-02 | -6.97E-01 |
| $a_6$ | 6.77E-01 | 4.48E-01 | -9.28E-01 | 8.28E-01 |
| $a_8$ | -3.34E+01 | 1.70E+00 | 3.28E+00 | -6.26E-01 |
| $a_{10}$ | 1.80E+01 | -1.72E+01 | -7.46E-01 | -2.43E-01 |
| $a_{12}$ | 5.41E+02 | 2.96E+01 | -3.91E+00 | 9.35E-01 |
| $a_{14}$ | -1.44E+03 | -1.86E+01 | 2.53E+00 | -8.69E-01 |
| $a_{16}$ | | | -2.29E-02 | 3.70E-01 |

FIG.5

| \multicolumn{7}{|c|}{f(Focus)= 1.826 mm, HFOV(Half angular field of view)= 34.072 deg., Total length of system= 2.367mm, Fno= 2.8, Image hieght= 1.235mm} |
|---|---|---|---|---|---|---|---|
| Surface # | | Radius | Thickness | Refractive index | Abbe number | Focus | Material |
| - | Object | ∞ | ∞ | | | | |
| 200 | Aperture stop | ∞ | -0.050 | | | | |
| 211 | 1st lens element | 1.006 | 0.413 | 1.545 | 55.93 | 1.016 | plastic |
| 212 | | -1.061 | 0.118 | | | | |
| 221 | 2nd lens element | -0.418 | 0.248 | 1.637 | 23.231 | -3.014 | plastic |
| 222 | | -0.657 | 0.289 | | | | |
| 231 | 3rd lens element | -1.411 | 0.311 | 1.545 | 55.93 | 1.601 | plastic |
| 232 | | -0.582 | 0.161 | | | | |
| 241 | 4th lens element | -1.146 | 0.250 | 1.532 | 56.064 | -1.039 | plastic |
| 242 | | 1.157 | 0.163 | | | | |
| 251 | IR cut filter | ∞ | 0.210 | | | | |
| 252 | | ∞ | 0.204 | | | | |
| 260 | Image plane | ∞ | | | | | |

FIG.8

| Aspherical parameters | | | | |
|---|---|---|---|---|
| Surface # | 211 | 212 | 221 | 222 |
| K | -1.02E+00 | -1.23E+00 | -1.57E+00 | -1.33E+00 |
| $a_4$ | -4.27E-01 | -2.14E+00 | -1.39E+00 | 9.75E-01 |
| $a_6$ | -2.66E+00 | 2.30E+00 | 1.52E+01 | 4.85E+00 |
| $a_8$ | 8.46E+00 | -1.32E+00 | -7.43E+01 | -3.23E+01 |
| $a_{10}$ | 8.20E+01 | -7.58E+01 | 3.28E+01 | 4.07E+01 |
| $a_{12}$ | -1.80E+03 | -2.28E+01 | 7.54E+02 | 6.03E+01 |
| $a_{14}$ | | | | |
| $a_{16}$ | | | | |
| Surface # | 231 | 232 | 241 | 242 |
| K | -2.85E+00 | -5.37E+00 | -1.12E-01 | -5.21E+01 |
| $a_4$ | 1.34E+00 | 3.75E-01 | 1.06E-01 | -6.95E-01 |
| $a_6$ | 3.92E-01 | 6.79E-01 | -8.26E-01 | 8.19E-01 |
| $a_8$ | -3.03E+01 | 1.87E+00 | 3.30E+00 | -5.93E-01 |
| $a_{10}$ | 1.91E+01 | -1.70E+01 | -6.98E-01 | -2.39E-01 |
| $a_{12}$ | 5.32E+02 | 2.93E+01 | -4.19E+00 | 8.92E-01 |
| $a_{14}$ | -1.48E+03 | -1.93E+01 | 2.63E+00 | -8.63E-01 |
| $a_{16}$ | | | -5.20E-02 | 3.99E-01 |

FIG.9

| f(Focus)= 1.930 mm, HFOV(Half angular field of view)= 32.609 deg., Total length of system= 2.485mm, Fno= 2.8, Image hieght= 1.235mm ||||||||
|---|---|---|---|---|---|---|---|
| Surface # | | Radius | Thickness | Refractive index | Abbe number | Focus | Material |
| - | Object | ∞ | ∞ | | | | |
| 300 | Aperture stop | ∞ | -0.050 | | | | |
| 311 | 1st lens element | 1.208 | 0.424 | 1.545 | 55.93 | 1.009 | plastic |
| 312 | | -0.890 | 0.110 | | | | |
| 321 | 2nd lens element | -0.416 | 0.238 | 1.637 | 23.231 | -2.782 | plastic |
| 322 | | -0.663 | 0.397 | | | | |
| 331 | 3rd lens element | -1.286 | 0.296 | 1.545 | 55.93 | 1.907 | plastic |
| 332 | | -0.623 | 0.207 | | | | |
| 341 | 4th lens element | -0.943 | 0.250 | 1.532 | 56.064 | -1.172 | plastic |
| 342 | | 2.039 | 0.148 | | | | |
| 351 | IR cut filter | ∞ | 0.210 | | | | |
| 352 | | ∞ | 0.206 | | | | |
| 360 | Image plane | ∞ | | | | | |

FIG.12

| Aspherical parameters | | | | |
|---|---|---|---|---|
| Surface # | 311 | 312 | 321 | 322 |
| K | -1.16E-01 | -2.09E+00 | -1.87E+00 | -1.47E+00 |
| $a_4$ | -6.58E-01 | -1.84E+00 | -1.08E+00 | 9.35E-01 |
| $a_6$ | -1.17E+00 | 3.24E+00 | 1.29E+01 | 2.63E+00 |
| $a_8$ | -8.25E+00 | -4.42E+00 | -7.29E+01 | -2.84E+01 |
| $a_{10}$ | 1.46E+02 | -8.29E+01 | 3.28E+01 | 4.54E+01 |
| $a_{12}$ | -1.37E+03 | 1.13E+02 | 6.23E+02 | 2.72E+01 |
| $a_{14}$ | | | | |
| $a_{16}$ | | | | |
| Surface # | 331 | 332 | 341 | 342 |
| K | -1.91E+00 | -5.39E+00 | -2.54E-01 | -2.16E+02 |
| $a_4$ | 1.22E+00 | 3.02E-01 | 1.62E-01 | -7.78E-01 |
| $a_6$ | 8.77E-02 | 7.01E-01 | -7.81E-01 | 8.82E-01 |
| $a_8$ | -2.98E+01 | 1.82E+00 | 3.31E+00 | -5.79E-01 |
| $a_{10}$ | 3.03E+01 | -1.69E+01 | -5.73E-01 | -2.35E-01 |
| $a_{12}$ | 4.85E+02 | 2.93E+01 | -4.34E+00 | 8.72E-01 |
| $a_{14}$ | -1.43E+03 | -2.01E+01 | 2.67E+00 | -8.53E-01 |
| $a_{16}$ | | | -3.85E-02 | 4.22E-01 |

FIG.13

| | f(Focus)= 1.663 mm, HFOV(Half angular field of view)= 36.594 deg., Total length of system= 2.466mm, Fno= 2.8, Image hieght= 1.235mm |
|---|---|---|---|---|---|---|---|
| Surface # | | Radius | Thickness | Refractive index | Abbe number | Focus | Material |
| - | Object | ∞ | ∞ | | | | |
| 400 | Aperture stop | ∞ | -0.050 | | | | |
| 411 | 1st lens element | 0.838 | 0.436 | 1.545 | 55.93 | 1.017 | plastic |
| 412 | | -1.347 | 0.155 | | | | |
| 421 | 2nd lens element | -0.342 | 0.232 | 1.637 | 23.231 | -3.424 | plastic |
| 422 | | -0.512 | 0.078 | | | | |
| 431 | 3rd lens element | -1.324 | 0.347 | 1.545 | 55.93 | 1.404 | plastic |
| 432 | | -0.531 | 0.085 | | | | |
| 441 | 4th lens element | -0.877 | 0.587 | 1.532 | 56.064 | -1.281 | plastic |
| 442 | | 3.833 | 0.145 | | | | |
| 451 | IR cut filter | ∞ | 0.210 | | | | |
| 452 | | ∞ | 0.190 | | | | |
| 460 | Image plane | ∞ | | | | | |

FIG.16

| Aspherical parameters | | | | |
|---|---|---|---|---|
| Surface # | 411 | 412 | 421 | 422 |
| K | -7.16E-01 | 1.77E+00 | -9.63E-01 | -1.21E+00 |
| $a_4$ | -5.80E-01 | -2.39E+00 | -2.92E+00 | 7.92E-01 |
| $a_6$ | 3.47E+00 | -5.86E+00 | 1.79E+01 | 7.62E+00 |
| $a_8$ | -4.66E+00 | 8.84E+00 | -1.73E+01 | -3.34E+01 |
| $a_{10}$ | -5.32E+02 | 8.89E+01 | 1.65E+02 | 9.87E+00 |
| $a_{12}$ | 2.86E+02 | -1.16E+03 | -1.20E+03 | 1.48E+02 |
| $a_{14}$ | | | | |
| $a_{16}$ | | | | |
| Surface # | 431 | 432 | 441 | 442 |
| K | 4.05E+00 | -1.90E+00 | -2.70E+00 | 9.30E-01 |
| $a_4$ | 1.16E+00 | 2.02E-01 | 8.41E-02 | -8.61E-01 |
| $a_6$ | 3.70E+00 | 8.33E-01 | -6.64E-01 | 9.73E-01 |
| $a_8$ | -3.82E+01 | 4.05E+00 | 2.64E+00 | -7.55E-01 |
| $a_{10}$ | 6.36E+00 | -1.71E+01 | -7.21E-01 | -1.68E-01 |
| $a_{12}$ | 5.28E+02 | 3.36E+01 | -3.39E+00 | 9.73E-01 |
| $a_{14}$ | -1.36E+03 | -2.50E+01 | 2.32E+00 | -9.66E-01 |
| $a_{16}$ | | | -4.84E-02 | 3.07E-01 |

FIG.17

| f(Focus)= 1.669 mm, HFOV(Half angular field of view)= 36.503 deg., Total length of system= 2.471mm, Fno= 2.8, Image hieght= 1.235mm ||||||||
|---|---|---|---|---|---|---|---|
| Surface # | | Radius | Thickness | Refractive index | Abbe number | Focus | Material |
| - | Object | ∞ | ∞ | | | | |
| 500 | Aperture stop | ∞ | -0.050 | | | | |
| 511 | 1st lens element | 0.851 | 0.407 | 1.545 | 55.93 | 1.021 | plastic |
| 512 | | -1.350 | 0.158 | | | | |
| 521 | 2nd lens element | -0.341 | 0.233 | 1.637 | 23.231 | -3.399 | plastic |
| 522 | | -0.512 | 0.073 | | | | |
| 531 | 3rd lens element | -1.365 | 0.357 | 1.545 | 55.93 | 1.383 | plastic |
| 532 | | -0.532 | 0.085 | | | | |
| 541 | 4th lens element | -0.881 | 0.612 | 1.532 | 56.064 | -1.274 | plastic |
| 542 | | 3.720 | 0.146 | | | | |
| 551 | IR cut filter | ∞ | 0.210 | | | | |
| 552 | | ∞ | 0.190 | | | | |
| 560 | Image plane | ∞ | | | | | |

FIG.20

| Aspherical parameters | | | | |
|---|---|---|---|---|
| Surface # | 511 | 512 | 521 | 522 |
| K | -7.57E-01 | 1.74E+00 | -9.63E-01 | -1.22E+00 |
| $a_4$ | -5.89E-01 | -2.39E+00 | -2.92E+00 | 8.01E-01 |
| $a_6$ | 3.39E+00 | -5.88E+00 | 1.79E+01 | 7.63E+00 |
| $a_8$ | -5.21E+00 | 8.55E+00 | -1.69E+01 | -3.34E+01 |
| $a_{10}$ | -5.34E+02 | 8.60E+01 | 1.68E+02 | 9.86E+00 |
| $a_{12}$ | 3.02E+02 | -1.19E+03 | -1.17E+03 | 1.47E+02 |
| $a_{14}$ | | | | |
| $a_{16}$ | | | | |
| Surface # | 531 | 532 | 541 | 542 |
| K | 4.01E+00 | -1.87E+00 | -2.58E+00 | 5.19E+00 |
| $a_4$ | 1.22E+00 | 1.97E-01 | 8.81E-02 | -8.25E-01 |
| $a_6$ | 3.73E+00 | 8.29E-01 | -6.49E-01 | 9.61E-01 |
| $a_8$ | -3.81E+01 | 4.05E+00 | 2.66E+00 | -7.61E-01 |
| $a_{10}$ | 6.56E+00 | -1.71E+01 | -7.04E-01 | -1.64E-01 |
| $a_{12}$ | 5.29E+02 | 3.36E+01 | -3.38E+00 | 9.83E-01 |
| $a_{14}$ | -1.36E+03 | -2.49E+01 | 2.32E+00 | -9.56E-01 |
| $a_{16}$ | | | -5.54E-02 | 3.14E-01 |

FIG.21

| Surface # | | Radius | Thickness | Refractive index | Abbe number | Focus | Material |
|---|---|---|---|---|---|---|---|
| | f(Focus)= 1.683 mm, HFOV(Half angular field of view)= 36.268 deg., Total length of system= 2.311mm, Fno= 2.8, Image hieght= 1.235mm | | | | | | |
| - | Object | ∞ | ∞ | | | | |
| 600 | Aperture stop | ∞ | -0.050 | | | | |
| 611 | 1st lens element | 0.779 | 0.452 | 1.545 | 55.93 | 0.977 | plastic |
| 612 | | -1.350 | 0.121 | | | | |
| 621 | 2nd lens element | -0.403 | 0.302 | 1.637 | 23.231 | -13.611 | plastic |
| 622 | | -0.546 | 0.081 | | | | |
| 631 | 3rd lens element | -1.413 | 0.395 | 1.545 | 55.93 | 1.19 | plastic |
| 632 | | -0.489 | 0.084 | | | | |
| 641 | 4th lens element | -0.485 | 0.332 | 1.532 | 56.064 | -0.819 | plastic |
| 642 | | 5.514 | 0.144 | | | | |
| 651 | IR cut filter | ∞ | 0.210 | | | | |
| 652 | | ∞ | 0.190 | | | | |
| 660 | Image plane | ∞ | | | | | |

FIG.24

| Aspherical parameters | | | | |
|---|---|---|---|---|
| Surface # | 611 | 612 | 621 | 622 |
| K | -3.69E-01 | -1.45E+00 | -1.08E+00 | -1.72E+00 |
| $a_4$ | -4.21E-01 | -2.45E+00 | -2.55E+00 | 7.92E-01 |
| $a_6$ | 1.03E+00 | -2.32E+00 | 1.93E+01 | 7.79E+00 |
| $a_8$ | 6.14E+00 | -3.24E+00 | -5.50E+01 | -3.11E+01 |
| $a_{10}$ | -6.22E+01 | -1.11E+01 | 7.53E+01 | 3.34E+01 |
| $a_{12}$ | -2.09E+03 | -9.74E+02 | -1.65E+03 | 3.14E+01 |
| $a_{14}$ | | | | |
| $a_{16}$ | | | | |
| Surface # | 631 | 632 | 641 | 642 |
| K | 6.53E-01 | -2.72E+00 | -3.72E+00 | -2.41E+02 |
| $a_4$ | 1.23E+00 | 5.11E-01 | 2.17E-01 | -4.11E-01 |
| $a_6$ | 2.48E+00 | 2.24E-01 | -5.03E-01 | 6.44E-01 |
| $a_8$ | -3.93E+01 | 8.07E-01 | 2.02E+00 | -6.73E-01 |
| $a_{10}$ | 9.52E+00 | -1.69E+01 | -8.49E-01 | -1.55E-01 |
| $a_{12}$ | 5.48E+02 | 3.05E+01 | -2.43E+00 | 1.16E+00 |
| $a_{14}$ | -1.56E+03 | -9.10E+00 | 2.41E+00 | -1.25E+00 |
| $a_{16}$ | | | -4.97E-01 | 4.94E-01 |

FIG.25

| | f(Focus)= 1.744 mm, HFOV(Half angular field of view)= 35.307 deg., Total length of system= 2.489mm, Fno= 2.8, Image hieght= 1.235mm |
|---|---|---|---|---|---|---|---|
| Surface # | | Radius | Thickness | Refractive index | Abbe number | Focus | Material |
| - | Object | ∞ | ∞ | | | | |
| 700 | Aperture stop | ∞ | -0.050 | | | | |
| 711 | 1st lens element | 0.842 | 0.516 | 1.545 | 55.93 | 1.035 | plastic |
| 712 | | -1.351 | 0.135 | | | | |
| 721 | 2nd lens element | -0.407 | 0.335 | 1.637 | 23.231 | -39.702 | plastic |
| 722 | | -0.547 | 0.085 | | | | |
| 731 | 3rd lens element | -1.465 | 0.417 | 1.545 | 55.93 | 1.14 | plastic |
| 732 | | -0.481 | 0.079 | | | | |
| 741 | 4th lens element | -0.484 | 0.352 | 1.532 | 56.064 | -0.816 | plastic |
| 742 | | 5.518 | 0.171 | | | | |
| 751 | IR cut filter | ∞ | 0.210 | | | | |
| 752 | | ∞ | 0.190 | | | | |
| 760 | Image plane | ∞ | | | | | |

FIG.28

| Aspherical parameters | | | | |
|---|---|---|---|---|
| Surface # | 711 | 712 | 721 | 722 |
| K | -7.59E-01 | -6.19E+00 | -1.06E+00 | -1.62E+00 |
| $a_4$ | -5.33E-01 | -2.26E+00 | -2.59E+00 | 7.06E-01 |
| $a_6$ | 4.42E+00 | -1.01E+00 | 2.14E+01 | 7.04E+00 |
| $a_8$ | -5.14E+00 | 3.22E+00 | -6.90E+01 | -3.25E+01 |
| $a_{10}$ | -1.35E+02 | -6.19E+00 | 1.05E+02 | 3.28E+01 |
| $a_{12}$ | -4.32E+02 | -9.47E+02 | -1.62E+03 | 2.79E+01 |
| $a_{14}$ | | | | |
| $a_{16}$ | | | | |
| Surface # | 731 | 732 | 741 | 742 |
| K | -1.18E+00 | -2.71E+00 | -3.57E+00 | -1.63E+02 |
| $a_4$ | 1.36E+00 | 4.88E-01 | 2.22E-01 | -4.18E-01 |
| $a_6$ | 2.64E+00 | 2.14E-01 | -4.99E-01 | 6.73E-01 |
| $a_8$ | -3.99E+01 | 8.18E-01 | 2.02E+00 | -6.41E-01 |
| $a_{10}$ | 6.48E+00 | -1.71E+01 | -8.48E-01 | -1.43E-01 |
| $a_{12}$ | 5.56E+02 | 2.99E+01 | -2.44E+00 | 1.16E+00 |
| $a_{14}$ | -1.41E+03 | -1.11E+01 | 2.39E+00 | -1.26E+00 |
| $a_{16}$ | | | -5.04E-01 | 4.77E-01 |

FIG.29

| \multicolumn{7}{c|}{f(Focus)= 1.745 mm, HFOV(Half angular field of view)= 35.288 deg., Total length of system= 2.247mm, Fno= 2.8, Image hieght= 1.235mm} |
|---|---|---|---|---|---|---|---|
| Surface # | | Radius | Thickness | Refractive index | Abbe number | Focus | Material |
| - | Object | ∞ | ∞ | | | | |
| 800 | Aperture stop | ∞ | -0.050 | | | | |
| 811 | 1st lens element | 1.022 | 0.437 | 1.545 | 55.930 | 1.089 | plastic |
| 812 | | -1.210 | 0.267 | | | | |
| 821 | 2nd lens element | -0.419 | 0.228 | 1.637 | 23.231 | -4.154 | plastic |
| 822 | | -0.603 | 0.078 | | | | |
| 831 | 3rd lens element | -1.382 | 0.340 | 1.545 | 55.930 | 1.308 | plastic |
| 832 | | -0.512 | 0.080 | | | | |
| 841 | 4th lens element | -1.632 | 0.250 | 1.532 | 56.064 | -0.852 | plastic |
| 842 | | 0.664 | 0.198 | | | | |
| 851 | IR cut filter | ∞ | 0.210 | | | | |
| 852 | | ∞ | 0.160 | | | | |
| 860 | Image plane | ∞ | | | | | |

FIG.32

| Aspherical parameters | | | | |
|---|---|---|---|---|
| Surface # | 811 | 812 | 821 | 822 |
| K | -8.16E-01 | -4.64E+00 | -1.34E+00 | -1.27E+00 |
| $a_4$ | -3.65E-01 | -1.54E+00 | -2.24E+00 | 9.17E-01 |
| $a_6$ | -6.13E+00 | -1.66E+00 | 2.27E+01 | 7.49E+00 |
| $a_8$ | 1.31E+01 | 3.30E-01 | -4.37E+01 | -3.35E+01 |
| $a_{10}$ | 8.28E+01 | 9.81E+00 | 5.47E+01 | 5.18E+01 |
| $a_{12}$ | -1.24E+03 | -7.08E+01 | 9.26E+00 | 7.68E+01 |
| $a_{14}$ | | | | |
| $a_{16}$ | | | | |
| Surface # | 831 | 832 | 841 | 842 |
| K | -5.21E+00 | -3.84E+00 | -2.19E-01 | -1.35E+01 |
| $a_4$ | 1.34E+00 | 5.82E-01 | -3.27E-02 | -7.90E-01 |
| $a_6$ | 9.61E-01 | 3.14E-01 | -9.20E-01 | 9.26E-01 |
| $a_8$ | -3.24E+01 | 1.68E+00 | 3.37E+00 | -8.52E-01 |
| $a_{10}$ | -5.37E-01 | -1.87E+01 | -8.74E-01 | -2.58E-01 |
| $a_{12}$ | 6.01E+02 | 3.99E+01 | -4.23E+00 | 1.16E+00 |
| $a_{14}$ | -1.54E+03 | -2.89E+01 | 2.76E+00 | -9.14E-01 |
| $a_{16}$ | | | 1.86E-01 | 2.47E-01 |

FIG.33

| | f(Focus)= 1.699 mm, HFOV(Half angular field of view)= 36.021 deg., Total length of system= 2.307mm, Fno= 2.8, Image hieght= 1.235mm |
|---|---|---|---|---|---|---|---|
| Surface # | | Radius | Thickness | Refractive index | Abbe number | Focus | Material |
| - | Object | ∞ | ∞ | | | | |
| 900 | Aperture stop | ∞ | -0.050 | | | | |
| 911 | 1st lens element | 0.866 | 0.442 | 1.545 | 55.930 | 1.039 | plastic |
| 912 | | -1.354 | 0.187 | | | | |
| 921 | 2nd lens element | -0.398 | 0.305 | 1.637 | 23.231 | -19.126 | plastic |
| 922 | | -0.535 | 0.080 | | | | |
| 931 | 3rd lens element | -1.548 | 0.395 | 1.545 | 55.930 | 1.168 | plastic |
| 932 | | -0.493 | 0.096 | | | | |
| 941 | 4th lens element | -0.504 | 0.250 | 1.532 | 56.064 | -0.803 | plastic |
| 942 | | 3.351 | 0.152 | | | | |
| 951 | IR cut filter | ∞ | 0.210 | | | | |
| 952 | | ∞ | 0.190 | | | | |
| 960 | Image plane | ∞ | | | | | |

FIG.36

| Aspherical parameters | | | | |
|---|---|---|---|---|
| Surface # | 911 | 912 | 921 | 922 |
| K | -1.13E+00 | -6.41E+00 | -1.08E+00 | -1.48E+00 |
| $a_4$ | -6.07E-01 | -2.26E+00 | -2.55E+00 | 6.74E-01 |
| $a_6$ | 3.78E+00 | -1.06E+00 | 2.09E+01 | 7.12E+00 |
| $a_8$ | -1.36E+01 | 2.37E+00 | -7.07E+01 | -3.24E+01 |
| $a_{10}$ | -2.04E+02 | -1.53E+01 | 1.17E+02 | 3.23E+01 |
| $a_{12}$ | -6.83E+02 | -1.00E+03 | -1.39E+03 | 2.04E+01 |
| $a_{14}$ | | | | |
| $a_{16}$ | | | | |
| Surface # | 931 | 932 | 941 | 942 |
| K | -3.76E-01 | -2.81E+00 | -3.49E+00 | -3.47E+02 |
| $a_4$ | 1.30E+00 | 5.21E-01 | 2.02E-01 | -4.57E-01 |
| $a_6$ | 2.54E+00 | 2.71E-01 | -5.21E-01 | 6.40E-01 |
| $a_8$ | -3.94E+01 | 9.03E-01 | 2.01E+00 | -6.66E-01 |
| $a_{10}$ | 7.10E+00 | -1.70E+01 | -8.52E-01 | -1.49E-01 |
| $a_{12}$ | 5.51E+02 | 3.00E+01 | -2.44E+00 | 1.16E+00 |
| $a_{14}$ | -1.45E+03 | -1.08E+01 | 2.39E+00 | -1.26E+00 |
| $a_{16}$ | | | -5.03E-01 | 4.74E-01 |

FIG.37

| Embodiment | 1st Embodiment | 2nd Embodiment | 3rd Embodiment | 4th Embodiment | 5th Embodiment |
|---|---|---|---|---|---|
| ALT (mm) | 1.216 | 1.222 | 1.208 | 1.602 | 1.609 |
| $G_{aa}$ (mm) | 0.538 | 0.567 | 0.714 | 0.318 | 0.315 |
| BFL (mm) | 0.591 | 0.577 | 0.563 | 0.545 | 0.546 |
| $\dfrac{G_{aa}}{G_{34}}$ | 3.456 | 3.534 | 3.449 | 3.749 | 3.712 |
| $\dfrac{G_{12}}{BFL}$ | 0.219 | 0.204 | 0.196 | 0.285 | 0.289 |
| $\dfrac{T_4}{T_3}$ | 0.799 | 0.804 | 0.844 | 1.691 | 1.715 |
| $\dfrac{G_{aa}}{ALT}$ | 0.443 | 0.464 | 0.591 | 0.199 | 0.196 |
| $\dfrac{G_{23}}{T_2}$ | 0.622 | 0.700 | 0.937 | 0.179 | 0.178 |
| $\dfrac{G_{23}}{BFL}$ | 0.428 | 0.501 | 0.704 | 0.143 | 0.133 |
| $\dfrac{T_3}{G_{23}}$ | 1.237 | 1.076 | 0.747 | 4.450 | 4.921 |

| Embodiment | 6th Embodiment | 7th Embodiment | 8th Embodiment | 9th Embodiment |
|---|---|---|---|---|
| ALT (mm) | 1.481 | 1.619 | 1.254 | 1.391 |
| $G_{aa}$ (mm) | 0.286 | 0.299 | 0.425 | 0.363 |
| BFL (mm) | 0.544 | 0.571 | 0.568 | 0.552 |
| $\dfrac{G_{aa}}{G_{34}}$ | 3.380 | 3.765 | 5.341 | 3.799 |
| $\dfrac{G_{12}}{BFL}$ | 0.222 | 0.236 | 0.470 | 0.339 |
| $\dfrac{T_4}{T_3}$ | 0.841 | 0.843 | 0.734 | 0.632 |
| $\dfrac{G_{aa}}{ALT}$ | 0.193 | 0.185 | 0.339 | 0.261 |
| $\dfrac{G_{23}}{T_2}$ | 0.178 | 0.164 | 0.180 | 0.182 |
| $\dfrac{G_{23}}{BFL}$ | 0.148 | 0.148 | 0.138 | 0.146 |
| $\dfrac{T_3}{G_{23}}$ | 4.904 | 4.931 | 4.342 | 4.909 |

FIG.38

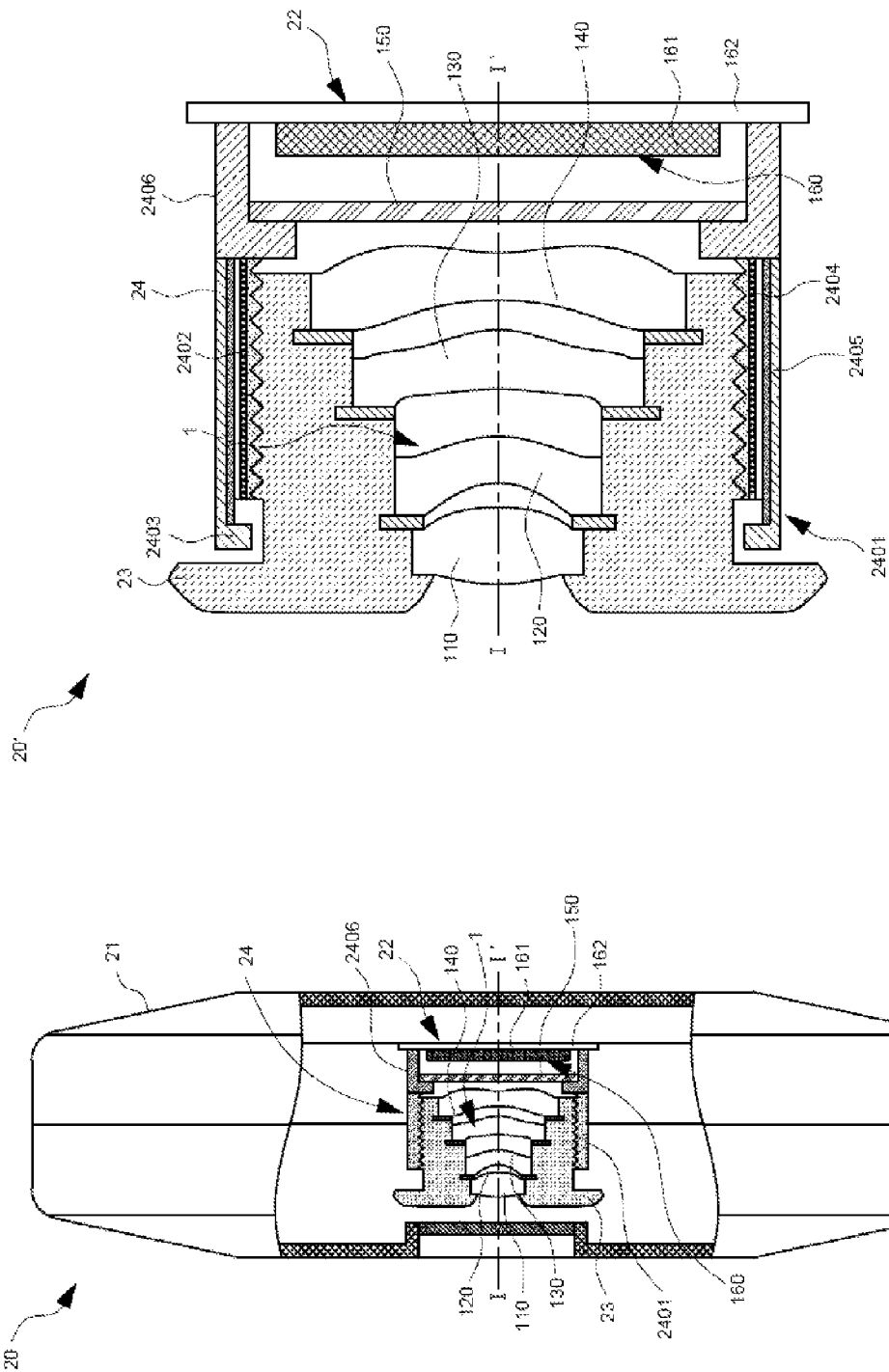

MOBILE DEVICE AND OPTICAL IMAGING LENS THEREOF

INCORPORATION BY REFERENCE

This application claims priority from Taiwan Patent Application No. 101151137, filed on Dec. 28, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having four lens elements and an optical imaging lens thereof.

BACKGROUND

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

US Patent Publication No. 2011/0299178 disclosed an optical imaging lens constructed with an optical imaging lens having four lens elements, in which the first lens element has negative refractive power and the object-side and image-side surfaces thereof are concave surfaces, and the second lens element has positive refractive power and the object-side and image-side surfaces thereof are convex surfaces, such that the total length of the system approximately equals to 18-19 mm, which is difficult to reduce the length of the optical imaging lens and maintain good optical characteristics, such that which is unfavorable for endeavoring slimmer mobile devices, such as cell phones and digital cameras.

US Patent Publication No. 2011/0188132 and US Patent Publication No. 2011/0188133 both disclosed an optical imaging lens constructed with an optical imaging lens having four lens elements, in which the first and second lens elements have negative refractive power, but the portion of embodiments have excessive air gap between the first and second lens elements, which is difficult to reduce the total length of system and unfavorable for endeavoring slimmer mobile devices, such as cell phones and digital cameras.

Besides, U.S. Pat. Nos. 7,345,830, 7,375,903, 8,253,843, and US Patent Publication No. 2011/0157453 all disclosed an optical image lens constructed with an optical imaging lens having four lens elements, in which the first and second lens elements have positive/negative refractive power arrangement, but the portion of embodiments have excessive air gap between the first and second lens elements, which is difficult to reduce the total length of system and unfavorable for endeavoring slimmer mobile devices, such as cell phones and digital cameras.

How to effectively shorten the length of the optical imaging lens is one of the most important topics in the industry to pursue the trend of smaller and smaller mobile devices. Therefore, there is needed to develop optical imaging lens with a shorter length, while also having good optical characters.

SUMMARY

An object of the present invention is to provide a mobile device and an optical imaging lens thereof. With controlling the convex or concave shape of the surfaces of the lens elements, the length of the optical imaging lens is shortened and meanwhile the good optical characters, such as high resolution, are sustained.

In an exemplary embodiment, an optical imaging lens, sequentially from an object side to an image side, comprises an aperture stop, first, second, third, and fourth lens elements, each of said lens elements having an object-side surface facing toward the object side and an image-side surface facing toward the image side. The first lens element has a positive refractive power, and the object-side surface thereof is a convex surface. The second lens element has a negative refractive power, the object-side surface thereof comprises a concave portion in a vicinity of a periphery of the second lens element, and the image-side surface thereof comprises a convex portion in a vicinity of a periphery of the second lens element. The image-side surface of the fourth lens element comprises a concave portion in a vicinity of the optical axis and a convex portion in a vicinity of a periphery of the fourth lens element. The optical imaging lens as a whole having only the four lens elements having refractive power. The sum of all air gaps from the first lens element to the fourth lens element along the optical axis is $G_{aa}$, an air gap between the third lens element and the fourth lens element along the optical axis is $G_{34}$, and $G_{aa}$ and $G_{34}$ satisfy the equation:

$$\frac{G_{aa}}{G_{34}} \leq 6.0. \qquad \text{Equation (1)}$$

When the sum of all air gaps from the first lens element to the fourth lens element along the optical axis is remained constant, the air gap between the third lens element and the fourth lens element along the optical axis $G_{34}$ could be increased, such that $G_{aa}$ and $G_{34}$ satisfy Equation (1) for having good optical characters.

In an exemplary embodiment, in additional to control $G_{aa}$ and $G_{34}$ to meet Equation (1), the image-side surface of the first lens element may be designed to have a convex portion in a vicinity of a periphery of the first lens element. In another exemplary embodiment, other related parameters of the optical imaging lens, such as the relations of each central thickness of each lens element along the optical axis and each air gap between two adjacent lens elements along the optical axis, the relations of the sum of all air gaps between the four lens elements along the optical axis and the sum of all thickness of the four lens element along the optical axis, and each air gap between two adjacent lens elements and each focal lens of each lens element could be controlled. An example among them is controlling a back focal length of the optical imaging lens, BFL (a distance from the image-side surface of the fourth lens element to an image plane along the optical axis), an air gap between the first lens element and the second lens element along the optical axis, $G_{12}$, a central thickness of the third lens element along the optical axis, $T_3$, and an air gap between the second lens element and the third lens element along the optical axis, $G_{23}$, to satisfy at least one relation as follows:

$$\frac{G_{12}}{BFL} \le 0.3; \quad \text{Equation (2)}$$

$$\frac{T_3}{G_{23}} \le 5.0; \quad \text{Equation (3)}$$

$$\frac{G_{23}}{BFL} \le 0.15. \quad \text{Equation (4)}$$

In another exemplary embodiment, in addition to control $G_{aa}$ and $G_{34}$ to satisfy Equation (1), and control $G_{12}$ and BFL to satisfy Equation (2), an air gap between the second lens element and the third lens element along the optical axis, $G_{23}$, a central thickness of the first lens element along the optical axis, $T_1$, and the sum of the thickness of all four lens elements along the optical axis, ALT, could be controlled to satisfy at least one relation as follows:

$$\frac{G_{23}}{T_1} \le 0.18; \quad \text{Equation (5)}$$

$$\frac{G_{aa}}{ALT} \le 0.29. \quad \text{Equation (6)}$$

In another exemplary embodiment, in addition to control $G_{aa}$ and $G_{34}$ to satisfy Equation (1), $G_{23}$, BFL, and $T_1$ could be controlled to satisfy at least one relation as follows:

$$0.10 \le \frac{G_{23}}{BFL} \le 0.15; \quad \text{Equation (4')}$$

$$0.15 \le \frac{G_{23}}{T_1} \le 0.18. \quad \text{Equation (5')}$$

In another exemplary embodiment, in addition to control $G_{aa}$ and $G_{34}$ to satisfy Equation (1), a central thickness of the forth lens element along the optical axis, $T_4$, and $T_3$ could be controlled to satisfy the following relation:

$$\frac{T_4}{T_3} \le 0.85. \quad \text{Equation (7)}$$

In another exemplary embodiment, in addition to control $G_{aa}$ and $G_{34}$ to satisfy Equation (1), and control $T_4$ and $T_3$ to satisfy Equation (7), the image-side surface of the first lens element may be designed to have a convex portion in a vicinity of the optical axis.

In another exemplary embodiment, in addition to control $G_{aa}$ and $G_{34}$ to satisfy Equation (1), $T_3$ and $G_{23}$ could be controlled to satisfy the following relation:

$$1.5 \le \frac{T_3}{G_{23}} \le 5.0. \quad \text{Equation (3')}$$

Aforesaid exemplary embodiments are not limited and could be selectively incorporated in other embodiments described herein.

In another exemplary embodiment, a mobile device comprises a housing and a photography module. The photography module is positioned in the housing and comprises a lens barrel, an optical imaging lens, a module housing unit, a substrate, and an image sensor. The optical image lens is positioned in the lens barrel. The module housing unit is configured to provide a space where the lens barrel is positioned. The substrate is configured to provide a space where the module housing unit is positioned. The image sensor is positioned on the substrate and at the image side of the optical imaging lens.

In exemplary embodiments, the module housing unit comprises, but is not limited to, a lens backseat, which comprises a first lens seat and a second lens seat, in which the first lens seat is positioned close to the outside of the lens barrel and along with an axis, the second lens seat is positioned along the axis and around the outside of the first lens seat, and the lens barrel and the optical imaging lens positioned therein are driven by the first lens seat to move along the axis.

In exemplary embodiments, the module housing unit further comprises, but is not limited to, an image sensor backseat positioned between the first lens seat, the second lens seat and the image sensor, and close to the second lens seat.

Through controlling the arrangement of the convex or concave shape of the surface of the lens element(s) and/or refractive power, the mobile device and the optical imaging lens thereof in aforesaid exemplary embodiments achieve good optical characters and effectively shorten the lengths of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of the first embodiment of an optical imaging lens according to the present disclosures;

FIG. 5 is a table of aspherical data of the first embodiment of the optical imaging lens according to the present disclosures;

FIG. 8 is a table of optical data for each lens element of the optical imaging lens of the second embodiment of the present disclosures;

FIG. 9 is a table of aspherical data of the second embodiment of the optical imaging lens according to the present disclosures;

FIG. 12 is a table of optical data for each lens element of the optical imaging lens of the third embodiment of the present disclosures;

FIG. 13 is a table of aspherical data of the third embodiment of the optical imaging lens according to the present disclosures;

FIG. 16 is a table of optical data for each lens element of the optical imaging lens of the fourth embodiment of the present disclosures;

FIG. 17 is a table of aspherical data of the fourth embodiment of the optical imaging lens according to the present disclosures;

FIG. 20 is a table of optical data for each lens element of the optical imaging lens of the fifth embodiment of the present disclosures;

FIG. 21 is a table of aspherical data of a fifth embodiment of the optical imaging lens according to the present disclosures;

FIG. 24 is a table of optical data for each lens element of the optical imaging lens of the sixth embodiment of the present disclosures;

FIG. 25 is a table of aspherical data of the sixth embodiment of the optical imaging lens according to the present disclosures;

FIG. 28 is a table of optical data for each lens element of the optical imaging lens of the seventh embodiment of the present disclosures;

FIG. 29 is a table of aspherical data of the seventh embodiment of the optical imaging lens according to the present disclosures;

FIG. 32 is a table of optical data for each lens element of the optical imaging lens of the eighth embodiment of the present disclosures;

FIG. 33 is a table of aspherical data of the eighth embodiment of the optical imaging lens according to the present disclosures;

FIG. 36 is a table of optical data for each lens element of the optical imaging lens of the ninth embodiment of the present disclosures;

FIG. 37 is a table of aspherical data of the ninth embodiment of the optical imaging lens according to the present disclosures;

FIG. 38 is a table for the values of $$\frac{G_{aa}}{G_{34}}, \frac{G_{12}}{BFL}, \frac{T_3}{G_{23}}, \frac{G_{23}}{BFL}, \frac{G_{23}}{T_1}, \frac{G_{aa}}{ALT}, \text{ and } \frac{T_4}{T_3}$$

Figure 1:
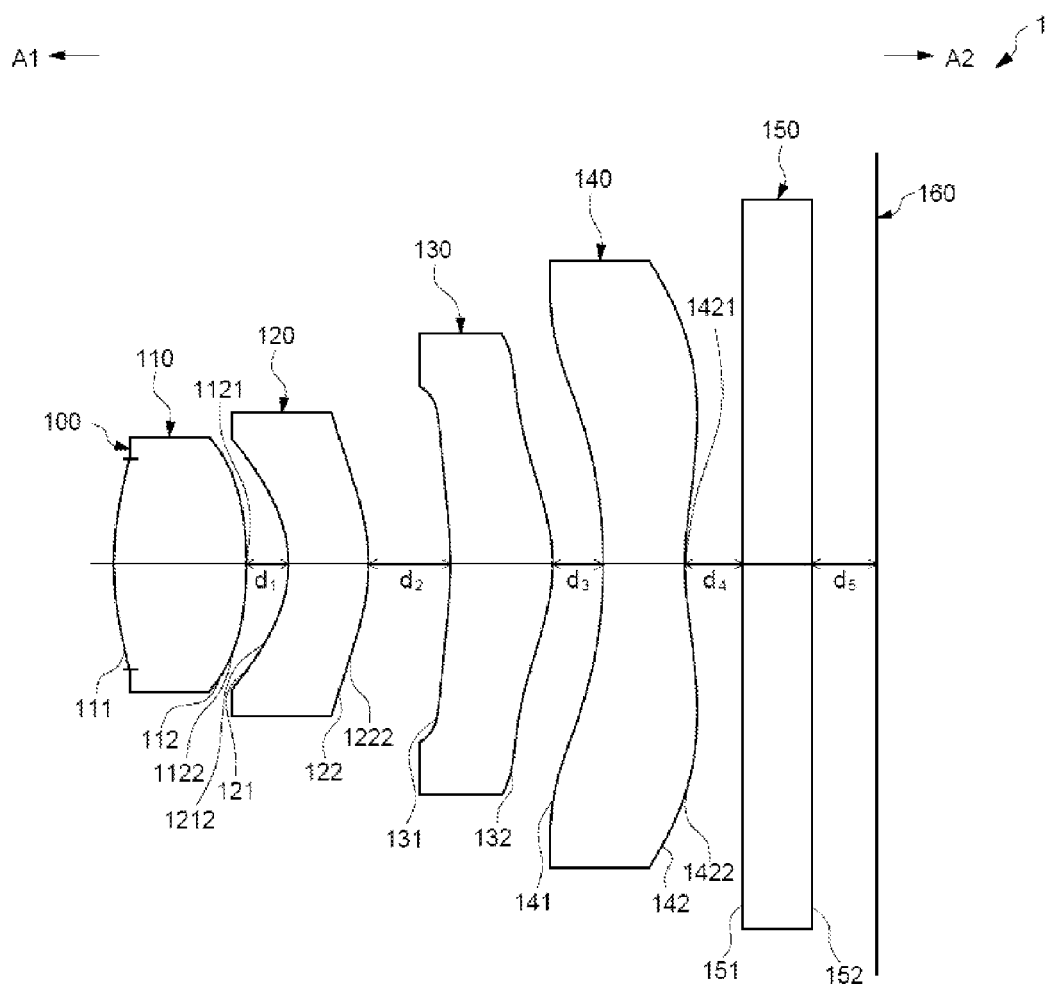
FIG. 1 is a cross-sectional view of a first embodiment of an optical imaging lens having four lens elements according to the present disclosures.
Figure 2:
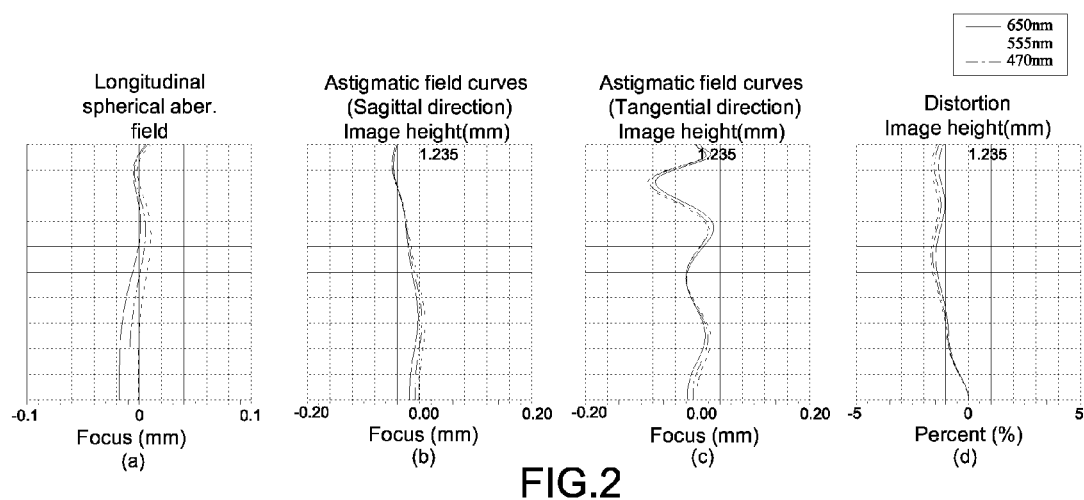
FIG. 2 is a chart of longitudinal spherical aberration and other kinds of optical aberrations of the first embodiment of the optical imaging lens according to the present disclosures.

of all nine example embodiments;

FIG. 39 is a structure of an example embodiment of a mobile device; and

FIG. 40 is a partially enlarged view of the structure of another example embodiment of a mobile device.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise an aperture stop, a first lens element, a second lens element, a third lens element, and a fourth lens element, each of the lens elements has an object-side surface facing toward the object side and an image-side surface facing toward the image side. These lens elements may be arranged sequentially from the object side to the image side, and example embodiments of the lens as a whole may comprise the four lens elements having refractive power. In an example embodiment: the first lens element has a positive refractive power, and the object-side surface thereof is a convex surface; the second lens element has a negative refractive power, the object-side surface thereof comprises a concave portion in a vicinity of a periphery of the second lens element, and the image-side surface thereof comprises a convex portion in a vicinity of a periphery of the second lens element; the image-side surface of said fourth lens element comprises a concave portion in a vicinity of the optical axis and a convex portion in a vicinity of a periphery of the fourth lens element; and the optical imaging lens as a whole has only the four lens elements having refractive power. Additionally, the sum of all air gaps from the first lens element to the fourth lens element along the optical axis is $G_{aa}$, an air gap between the third lens element and the fourth lens element along the optical axis is $G_{34}$, and $G_{aa}$ and $G_{34}$ satisfy the equation as follows:

$$\frac{G_{aa}}{G_{34}} \leq 6.0. \qquad \text{Equation (1)}$$

Preferably, the lens elements are designed in light of the optical characteristics and the length of the optical imaging lens. For example, the first lens element having a positive refractive power and an object-side surface being a convex surface provides the light converge ability required in the optical imaging lens. The second lens element having a negative refractive power, an object-side surface comprising a concave portion in a vicinity of a periphery of the second lens element, and an image-side surface comprising a convex portion in a vicinity of a periphery of the second lens element could eliminate the aberration of the optical lens. The fourth lens element having a concave portion in a vicinity of the optical axis on the object-side surface thereof and a convex portion in a vicinity of a periphery on the image-side surface thereof, could correct the field curvature of the optical imaging lens, reduce the high order aberration of the optical imaging lens, and depresses the angle of the chief ray (the incident angle of the light onto the image sensor), and then the sensitivity of the whole system is promoted to achieve good optical characters.

In another exemplary embodiment, other parameters could be controlled to satisfy other relations selectively. For example, a distance from the image-side surface of the fourth lens element to an image plane along the optical axis defined as a back focal length of the optical imaging lens, BFL, and an air gap between the first lens element and the second lens element along the optical axis, $G_{12}$, could be controlled to satisfy the equation as follows:

$$\frac{G_{12}}{BFL} \leq 0.3. \qquad \text{Equation (2)}$$

Optionally, a central thickness of the third lens element along the optical axis, $T_3$, and an air gap between the second lens element and the third lens element along the optical axis, $G_{23}$, could be controlled to satisfy the equations as follows:

$$\frac{T_3}{G_{23}} \leq 5.0; \qquad \text{Equation (3)}$$

or $$1.5 \leq \frac{T_3}{G_{23}} \leq 5.0. \qquad \text{Equation (3')}$$

Optionally, $G_{23}$ and BFL could be controlled to satisfy the equations as follows:

$$\frac{G_{23}}{BFL} \leq 0.15; \qquad \text{Equation (4)}$$

or $$0.10 \leq \frac{G_{23}}{BFL} \leq 0.15. \qquad \text{Equation (4')}$$

Optionally, $G_{23}$ and a central thickness of the first lens element along the optical axis, $T_1$, could be controlled to satisfy the equations as follows:

$$\frac{G_{23}}{T_1} \leq 0.18; \qquad \text{Equation (5)}$$

$$0.15 \leq \frac{G_{23}}{T_1} \leq 0.18. \qquad \text{Equation (5')}$$

Optionally, $G_{aa}$ and the sum of the thickness of all four lens elements along the optical axis, ALT, could be controlled to satisfy the equation as follows:

$$\frac{G_{aa}}{ALT} \leq 0.29. \qquad \text{Equation (6)}$$

Optionally, $T_3$ and a central thickness of the fourth lens element along the optical axis, $T_4$, could be controlled to satisfy the equation as follows:

$$\frac{T_4}{T_3} \leq 0.85. \qquad \text{Equation (7)}$$

Aforesaid exemplary embodiments are not limited and could be selectively incorporated in other embodiments described herein.

Reference is now made to Equation (1). $G_{aa}$ denotes the sum of three air gaps ($G_{12}$, $G_{23}$, and $G_{34}$) from the first lens element to the fourth lens element, in which $G_{34}$ is one of the three air gaps. Although $G_{12}$, $G_{23}$, and $G_{34}$ should be shrunken as far as possible to meet the demand of small sized optical imaging lens, the width existed between the third lens element and the fourth lens element still should be maintained to be a certain distance, such that the emitted light from the third lens element could extend at proper height and then incident to the fourth lens element, that is favor for the emitted light from the fourth lens element (imaging light) to incident to the image surface in a perpendicular angle related to the image surface approximately. Hence, comparing to the sum of all air gaps, $G_{aa}$, the shortened range of the air gap between the third lens element and the fourth lens element along the optical axis, $G_{34}$, is under a considerable restriction. In other words, the value of $$\frac{G_{aa}}{G_{34}}$$

should be restricted preferably by an upper limit such as Equation (1). More preferably, the value of $$\frac{G_{aa}}{G_{34}}$$

should be further restricted by a lower limit, for example but not limited to, $$2.5 \leq \frac{G_{aa}}{G_{34}} \leq 6.0.$$

Reference is now made to Equation (2). Although under the tendency of smaller sized optical imaging lens designs, and the air gap between the first lens element and the second lens element along the optical axis, $G_{12}$, should be shortened, the back focal length of the optical imaging lens, BFL, still should be maintained a proper distance for assembling, focusing light or receiving an infrared cut filter. Therefore, the value of $$\frac{G_{12}}{BFL}$$

should not be too large, and should be restricted preferably by an upper limit such as Equation (2). More preferably, the value of $$\frac{G_{12}}{BFL}$$

should be further restricted by a lower limit, for example but not limited to, $$0.1 \le \frac{G_{12}}{BFL} \le 0.3.$$

Reference is now made to Equation (3). For maintaining good optical characteristics and image quality, the ratio of the central thickness of the third lens element along the optical axis, $T_3$, and the air gap between the second lens element and the third lens element along the optical axis, $G_{23}$, should be maintained in a proper range. In practice, larger $G_{23}$ is favorable for fabrication, and smaller $T_3$ is favorable for endeavoring slimmer mobile devices. Hence, the value of $$\frac{T_3}{G_{23}}$$

should be restricted preferably by an upper limit such as Equation (3). More preferably, the value of $$\frac{T_3}{G_{23}}$$

should be further restricted by a lower limit, for example but not limited to, Equation (3').

Reference is now made to Equation (4), as above-mentioned description, the back focal length of the optical imaging lens, BFL, should be maintained in a proper range, and the shortened range of BFL is under a considerable restriction. Bedsides, the reduction of the air gap between the second lens element and the third lens element along the optical axis, $G_{23}$, is favorable for shortening the length of the optical imaging lens. Therefore, the value of $$\frac{G_{23}}{BFL}$$

is suggested being shortened gradually with the design tendency of the optical imaging lens, and preferably, for example but not limited to, satisfies Equation (4). More preferably, the value of $$\frac{G_{23}}{BFL}$$

should be further restricted by a lower limit, for example but not limited to, Equation (4').

Reference is now made to Equation (5). Although the reduction of the air gap between the second lens element and the third lens element along the optical axis, $G_{23}$, and the central thickness of the first lens element along the optical axis, $T_1$, are favorable for shortening the total length of the optical imaging lens, the first lens element has to provide the positive refractive power of the optical imaging lens as a whole, such that the shortened range of $T_1$ is under a considerable restriction. Hence, the value of $$\frac{G_{23}}{T_1}$$

should be restricted preferably by an upper limit such as Equation (5). More preferably, the value of $$\frac{G_{23}}{T_1}$$

should be further restricted by a lower limit, for example but not limited to, Equation (5').

Reference is now made to Equation (6). Although under the tendency of smaller sized optical imaging lens designs, the sum of all air gaps, $G_{aa}$, and all four lens elements along the optical axis, ALT, both should be reduced as far as possible, the thicknesses of the first to fourth lens elements are determined by the inherent limitation of fabrication technology. Hence, the shortened range of ALT is under a considerable restriction. In other words, comparing the shortened range of ALT, the shortened range of $G_{aa}$ is under less restriction. Therefore, the value of $$\frac{G_{aa}}{ALT}$$

is suggested being shortened gradually with the design tendency of the optical imaging lens, and preferably, for example but not limited to, satisfies Equation (6). More preferably, the value of $$\frac{G_{aa}}{ALT}$$

should be further restricted by a lower limit, for example but not limited to, $$0.1 \le \frac{G_{aa}}{ALT} \le 0.29.$$

Reference is now made to Equation (7). Since the image-side surface of the fourth lens element has a concave portion in a vicinity of the optical axis, and a convex portion in a vicinity of a periphery of the fourth lens element, the fourth lens element could improve the optical aberrations via the difference between the central and the periphery refractive power. However, if the central thickness of the fourth lens element along the optical axis, $T_4$, is excessive, that would lead to limit the refractive power difference. Hence, $T_4$ should not be too large. Comparing to $T_4$, $T_3$ has no limitation. In other words, the value of $$\frac{T_4}{T_3}$$

should be restricted preferably by an upper limit such as Equation (7).

When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 3:
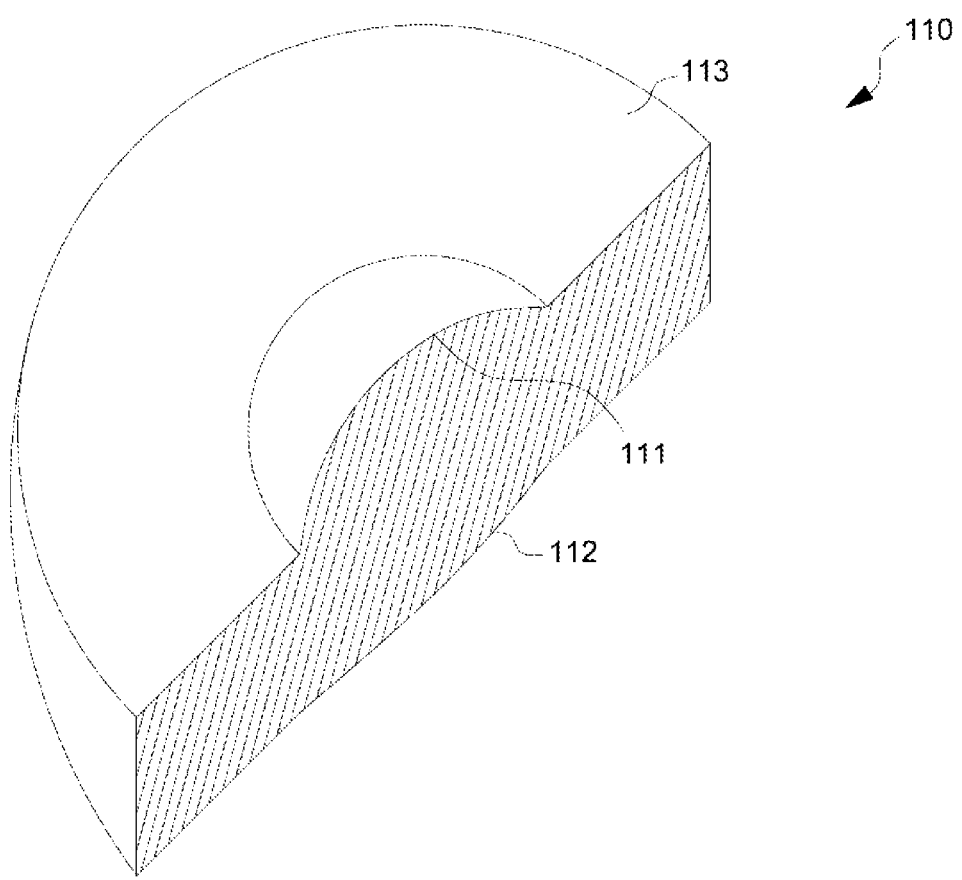
FIG. 3 is a cross-sectional view of a lens element of the optical imaging lens of an example embodiment of the present disclosures.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens 1 having four lens elements of the optical imaging lens according to a first example embodiment. FIGS. 2(a) to 2(d) show example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2, an aperture stop 100, a first lens element 110, a second lens element 120, a third lens element 130, and a fourth lens element 140. A filtering unit 150 and an image plane 160 of an image sensor are positioned at the image side A2 of the optical image lens 1. More specifically, the filtering unit 150 is an IR cut filter (infrared cut filter) positioned between the fourth lens 140 and the image plane 160 of the image sensor. The filtering unit 150 selectively absorbs light with specific wavelength from the light passing optical imaging lens 1. For example, IR light is absorbed, and this will prohibit the IR light which is not seen by human eyes from producing an image on the image plane 160.

Exemplary embodiments of each lens elements of the optical imaging lens 1 will now be described with reference to the drawings.

Each of the first, second, third, and fourth lens elements 110, 120, 130, 140 have an object-side surface 111/121/131/141 facing toward the object side A1 and an image-side surface 112/122/132/142 facing toward the image side A2. The aperture stop 100 is positioned in front of the first lens element 110. The first lens element 110 has a positive refractive power, which may be constructed by plastic material. The object-side surface 111 is a convex surface. The image-side surface 112 is a convex surface, which comprises a convex portion 1121 in a vicinity of the optical axis, and a convex portion 1122 in a vicinity of a periphery of the first lens element 110. The object-side surface 111 and the image-side surface 112 may be both aspherical surfaces.

The second lens element 120 may have a negative refractive power, which may be constructed by plastic material. The object-side surface 121 is a concave surface, which comprises a concave portion 1212 in a vicinity of a periphery of the second lens element 120. The image-side surface 122 is a convex surface, which comprises a convex portion 1222 in a vicinity of a periphery of the second lens element 120. The object-side surface 121 and the image-side surface 122 may be both aspherical surfaces.

The third lens element 130 may have a positive refractive power, which may be constructed by plastic material. The object-side surface 131 is a concave surface. The image-side surface 132 is a convex surface. The object-side surface 131 and the image-side surface 132 may be both aspherical surfaces.

The fourth lens element 140 may have a negative refractive power, which may be constructed by plastic material. The object-side surface 141 is a concave surface. The image-side surface 142 comprises a concave portion 1421 in a vicinity of the optical axis, and a convex portion 1422 in a vicinity of a periphery of the fourth lens element 140. The object-side surface 141 and the image-side surface 142 may be both aspherical surfaces.

In example embodiments, air gaps exist between the lens elements 110-140, the filtering unit 150, and the image plane 160 of the image sensor. For example, FIG. 1 illustrates the air gap $d_1$ existing between the first lens element 110 and the second lens element 120, the air gap $d_2$ existing between the second lens element 120 and the third lens element 130, the air gap $d_3$ existing between the third lens element 130 and the fourth lens element 140 the air gap $d_4$ existing between the fourth lens element 140 and the filtering unit 150, and the air gap $d_5$ existing between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap $d_1$ is denoted by $G_{12}$, the air gap $d_2$ is denoted by $G_{23}$, the air gaps $d_3$ is denoted by $G_{34}$, and the sum of all air gaps $d_1, d_2, d_3$ between the first though fourth lens elements is denoted by $G_{aa}$.

FIG. 4 depicts the optical characteristics of each lens elements in the optical imaging lens 1 of the present embodiment, wherein the values of $$\frac{G_{aa}}{G_{34}},$$

$$\frac{G_{12}}{BFL},$$

$$\frac{T_3}{G_{23}},$$

and $$\frac{T_4}{T_3}$$

are:

$$\frac{G_{aa}}{G_{34}} = 3.456, \quad \text{satisfying Equation (1);}$$

$$\frac{G_{12}}{BFL} = 0.219, \quad \text{satisfying Equation (2);}$$

$$\frac{T_3}{G_{23}} = 1.237, \quad \text{satisfying Equation (3);}$$

$$\frac{T_4}{T_3} = 0.799, \quad \text{satisfying Equation (7).}$$

The back focal length of the optical imaging lens, BFL, is 0.591 mm. The sum of all air gaps from the first lens element 110 to the fourth lens element 140 along the optical axis, $G_{aa}$, is 0.538 mm. The distance from the object-side surface 111 of the first lens element 110 to the image plane 160 is 2.345 mm, and the length of the optical imaging lens 1 is indeed shortened.

Please note that, in example embodiments, to clearly illustrate the structure of each lens element, only the part where light passes, is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side surface 111 and the image-side surface 112 to the edge of the first lens element 110 for mounting the first lens element 110 in the optical imaging lens 1, and ideally, light for imaging will not pass through the protruding part 113.

The aspherical surfaces, including the object-side surfaces 111, 121, 131, 141 and the image-side surfaces 112, 122, 132, 142 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents a aspherical coefficient of $2i^{th}$ order.

The values of each aspherical parameter, K, and $a_4 \sim a_{16}$ of each lens element 110, 120, 130, 140 are represented in FIG. 5.

FIG. 2(a) illustrates the longitudinal spherical aberration of the present embodiment, in which curves of different wavelengths are distributed closely, that means the off-axis light with different height of different wavelengths converge in a vicinity of the imaging point. FIG. 2(a) shows that the offsets between the off-axis light with different light and the imaging point are controlled to be ±0.02 mm. Therefore, the present embodiment improves the spherical aberration in different wavelengths obviously. Additionally, the distances between the three represented wavelengths are quite close, that means the image positions of the different wavelengths converge with one another, such that the chromatic aberration is improved obviously.

FIG. 2(b) illustrates an astigmatism aberration in the sagittal direction of the present embodiment, and FIG. 2(c) illustrates an astigmatism aberration in the tangential direction of the present embodiment. The focal lengths of the three represented wavelengths in the whole field of view are within ±0.10 mm, and the focal lengths of the sagittal direction are further controlled within ±0.05 mm. Therefore, the optical imaging lens 1 of the present embodiment could eliminate the aberration effectively. Additionally, the distances between the three represented wavelengths are quite close, that means the aberration is improved obviously.

FIG. 2(d) illustrates a distortion aberration of the present embodiment. The distortion aberration of the present embodiment is maintained within the range of ±2%, that means the distortion aberration meets the image quality of optical system. Accordingly, the system length of the optical imaging lens 1 is shortened to be 2.4 mm approximately, which could overcome the chromatic aberration and provide better image quality. Therefore, the present embodiment achieves great optical performance and the length of the optical imaging lens 1 is effectively shortened.

Figure 6:
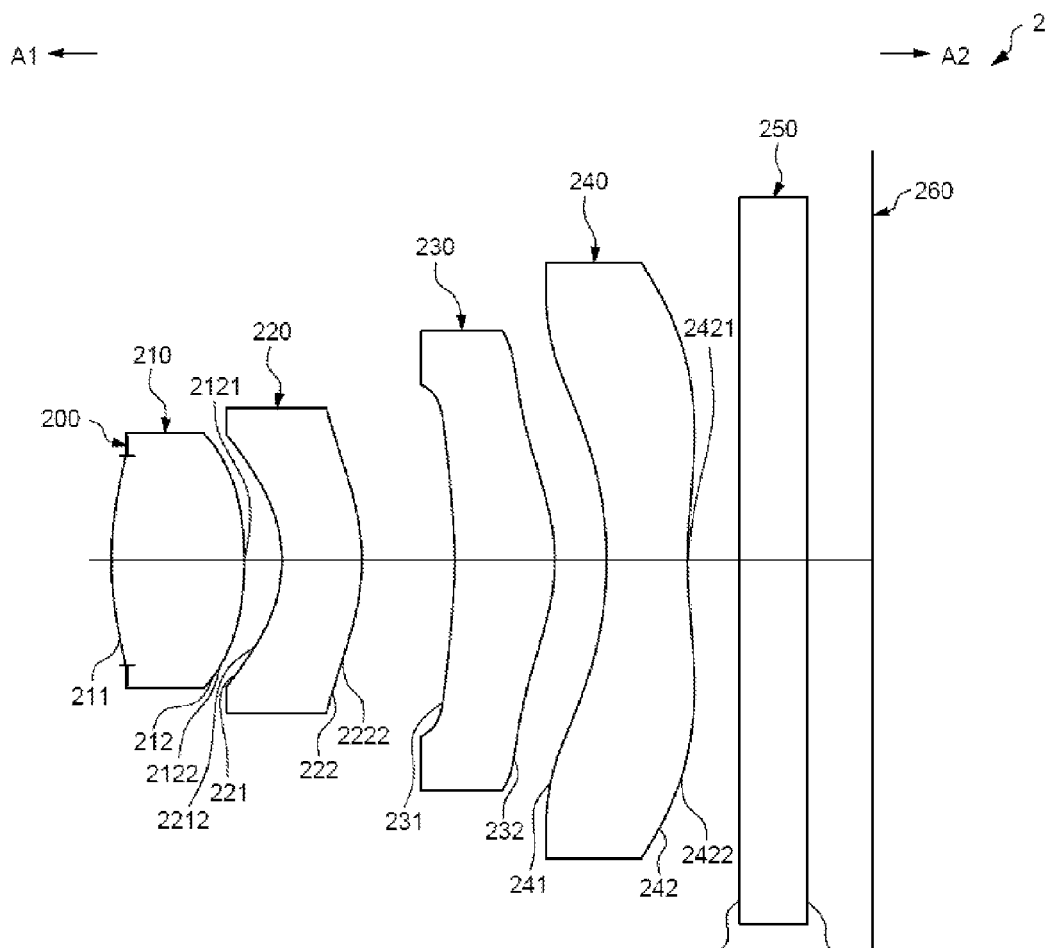
FIG. 6 is a cross-sectional view of a second embodiment of an optical imaging lens having four lens elements according to the present disclosures.
Figure 7:
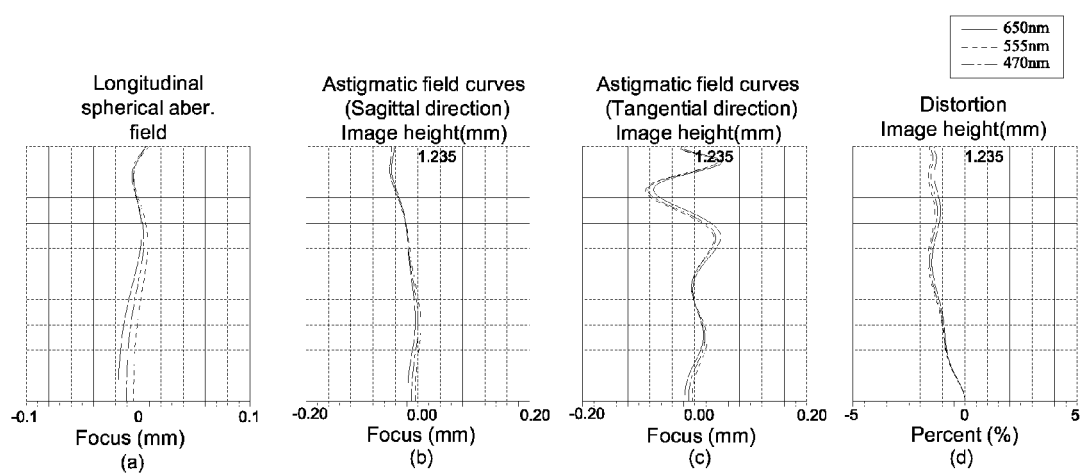
FIG. 7 is a chart of longitudinal spherical aberration and other kinds of optical aberrations of the second embodiment of the optical imaging lens according to the present disclosures.

Reference is now made to FIGS. 6-9. FIG. 6 illustrates an example cross-sectional view of an optical imaging lens 2 having four lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment.

As shown in FIG. 6, the second embodiment is similar to the first embodiment. The optical imaging lens 2, in an order from an object side A1 to an image side A2, comprises an aperture stop 200, first lens element to fourth lens element 210-240. A filtering unit 250 and an image plane 260 of an image sensor are positioned at the image side A2 of the optical imaging lens 2. The arrangement of the convex or concave surface structures, including the object-side surfaces 211-241 and image-side surfaces 212-242, and the refractive power of the lens elements 210-240 are same with the optical imaging lens 1. More Particularly, the image-side surface 212 of the first lens element 210 comprises a convex portion 2121 in a vicinity of the optical axis, and a convex portion 2122 in a vicinity of a periphery of the first lens element 210; the object-side surface 221 of the second lens element 220 comprises a concave portion 2212 in a vicinity of a periphery of the second lens element 220; the image-side surface 222 of the second lens element 220 comprises a convex portion 2222 in a vicinity of a periphery of the second lens element 220; the image-side surface 242 of the fourth lens element 240 comprises a concave portion 2421 in a vicinity of the optical axis, and a convex portion 2422 in a vicinity of a periphery of the fourth lens element 240. The difference between the optical imaging lens 1 and the optical imaging lens 2 is the radius of curvature, the values of the central thicknesses of the lens elements 210-240 and the air gaps between the lens elements 210-240 are slight different from the values of the optical imaging lens 1.

Please refer to FIG. 8 for the optical characteristics of each lens elements in the optical imaging lens 2 of the present embodiment, wherein the values of $$\frac{G_{aa}}{G_{34}}, \frac{G_{12}}{BFL}, \frac{T_3}{G_{23}}, \text{ and } \frac{T_4}{T_3}$$

are:

$\frac{G_{aa}}{G_{34}} = 3.534,$ satisfying Equation (1);

$\frac{G_{12}}{BFL} = 0.204,$ satisfying Equation (2);

$\frac{T_3}{G_{23}} = 1.706,$ satisfying Equations (3), and (3');

$\frac{T_4}{T_3} = 0.804,$ satisfying Equation (7).

Please note that, the back focal length of the optical imaging lens, BFL, is 0.577 mm. The sum of all air gaps from the first lens element 210 to the fourth lens element 240 along the optical axis, $G_{aa}$, is 0.567 mm. The distance from the object-side surface 211 of the first lens element 210 to the image plane 260 is 2.367 mm, and the length of the optical imaging lens 2 is indeed shortened.

As shown in FIGS. 7(a)-7(d), the optical imaging lens 2 of the present embodiment shows great characteristics in longitudinal spherical aberration 7(a), astigmatism in the sagittal direction 7(b), astigmatism in the tangential direction 7(c), and distortion aberration 7(d). Therefore, according to the above illustration, the optical imaging lens of the present embodiment indeed shows great optical performance and the length of the optical imaging lens 2 is effectively shortened.

Figure 10:
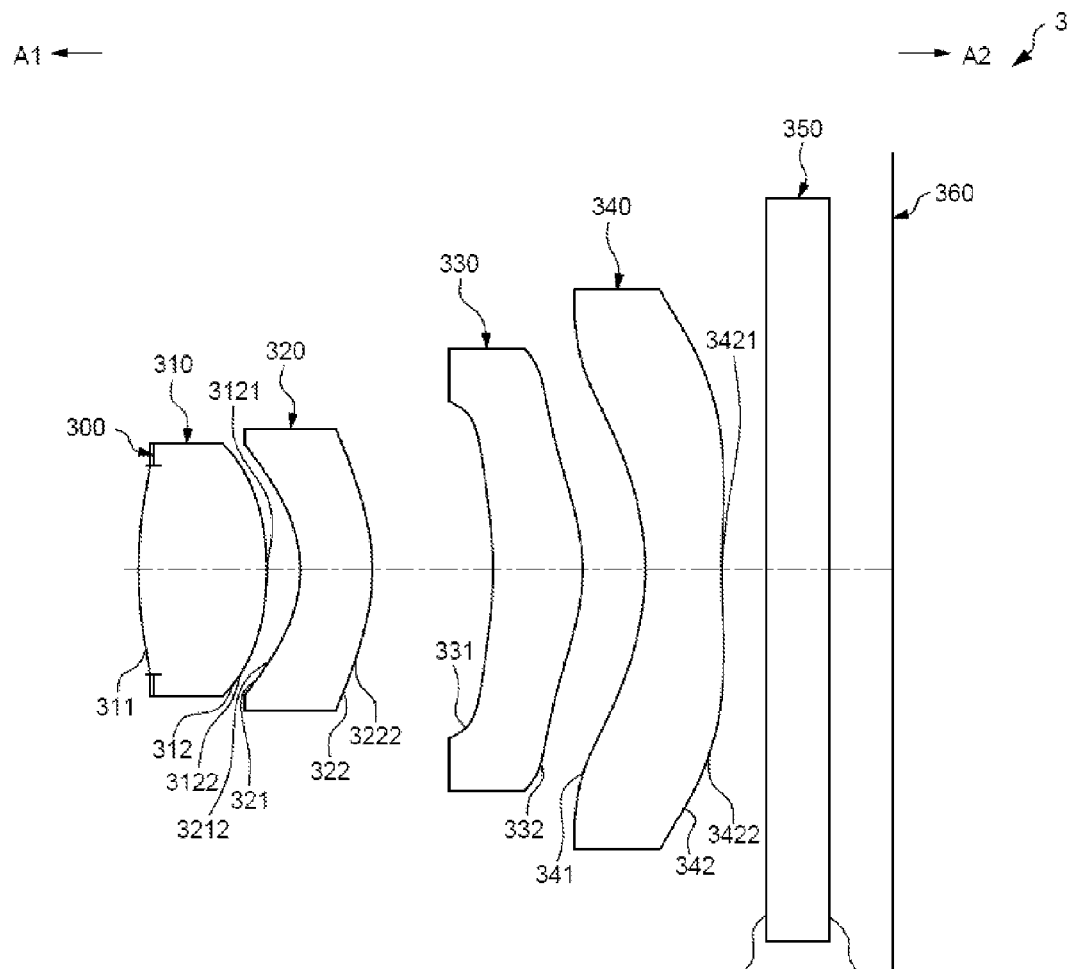
FIG. 10 is a cross-sectional view of a third embodiment of an optical imaging lens having four lens elements according to the present disclosures.
Figure 11:
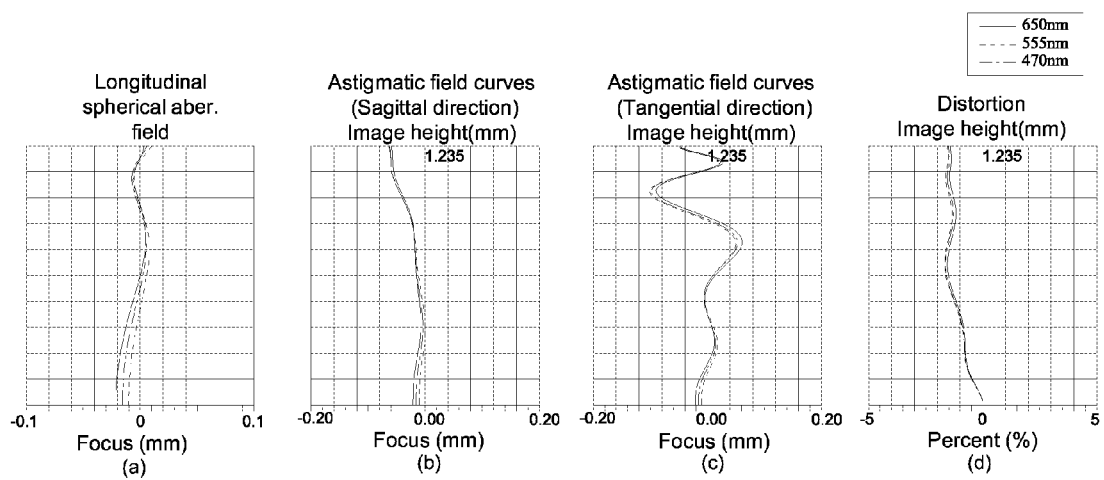
FIG. 11 is a chart of longitudinal spherical aberration and other kinds of optical aberrations of the third embodiment of the optical imaging lens according the present disclosures.

Reference is now made to FIGS. 10-13. FIG. 10 illustrates an example cross-sectional view of an optical imaging lens 3 having four lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment.

As shown in FIG. 10, the third embodiment is similar to the first embodiment. The optical imaging lens 3, in an order from an object side A1 to an image side A2, comprises an aperture stop 300, first lens element to fourth lens element 310-340. A filtering unit 350 and an image plane 360 of an image sensor are positioned at the image side A2 of the optical imaging lens 3. The arrangement of the convex or concave surface structures, including the object-side surfaces 311-341 and image-side surfaces 312-342, and the refractive power of the lens elements 310-340 are same with the optical imaging lens 1. More particularly, the image-side surface 312 of the first lens element 310 comprises a convex portion 3121 in a vicinity of the optical axis, and a convex portion 3122 in a vicinity of a periphery of the first lens element 310; the object-side surface 321 of the second lens element 320 comprises a concave portion 3212 in a vicinity of a periphery of the second lens element 320; the image-side surface 322 of the second lens element 320 comprises a convex portion 3222 in a vicinity of a periphery of the second lens element 320; the image-side surface 342 of the fourth lens element 340 comprises a concave portion 3421 in a vicinity of the optical axis, and a convex portion 3422 in a vicinity of a periphery of the fourth lens element 340. The difference between the optical imaging lens 1 and the optical imaging lens 3 is the radius of curvature, the values of the central thicknesses of the lens elements 310-340 and the air gaps between the lens elements 310-340 are slight different from the values of the optical imaging lens 1.

Please refer to FIG. 12 for the optical characteristics of each lens elements in the optical imaging lens 3 of the present embodiment, wherein the values of $$\frac{G_{aa}}{G_{34}}, \frac{G_{12}}{BFL}, \frac{T_3}{G_{23}}, \text{ and } \frac{T_4}{T_3}$$

are:

$$\frac{G_{aa}}{G_{34}} = 3.449, \quad \text{satisfying Equation (1);}$$

$$\frac{G_{12}}{BFL} = 0.196, \quad \text{satisfying Equation (2);}$$

$$\frac{T_3}{G_{23}} = 0.747, \quad \text{satisfying Equation (3);}$$

$$\frac{T_4}{T_3} = 0.844, \quad \text{satisfying Equation (7).}$$

Please note that, the back focal length of the optical imaging lens, BFL, is 0.563 mm. The sum of all air gaps from the first lens element 310 to the fourth lens element 340 along the optical axis, $G_{aa}$, is 0.714 mm. The distance from the object-side surface 311 of the first lens element 310 to the image plane 360 is 2.485 mm, and the length of the optical imaging lens 3 is indeed shortened.

As shown in FIGS. 11(a)-11(d), the optical imaging lens 3 of the present embodiment shows great characteristics in longitudinal spherical aberration 11(a), astigmatism in the sagittal direction 11(b), astigmatism in the tangential direction 11(c), and distortion aberration 11(d). Therefore, according to the above illustration, the optical imaging lens of the present embodiment indeed shows great optical performance and the length of the optical imaging lens 3 is effectively shortened.

Figure 14:
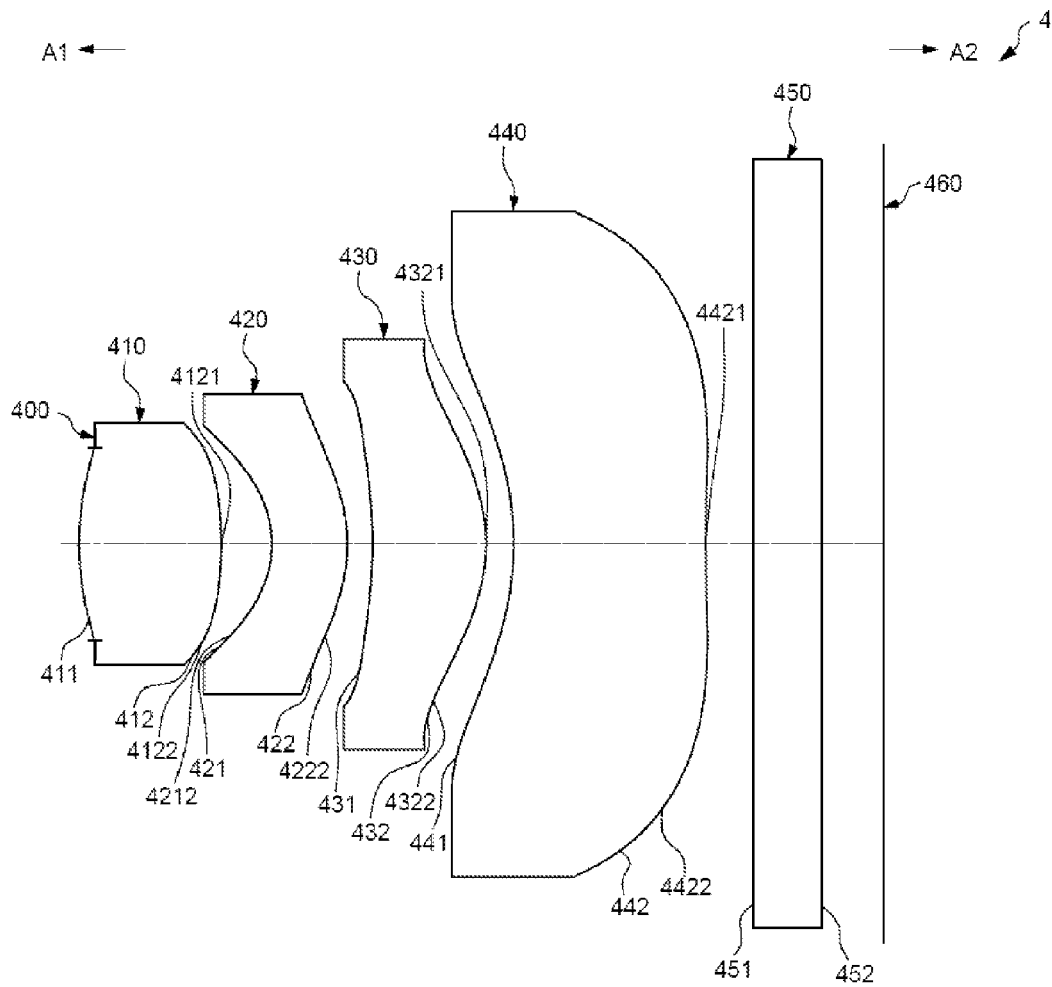
FIG. 14 is a cross-sectional view of a fourth embodiment of an optical imaging lens having four lens elements according to the present disclosures.
Figure 15:
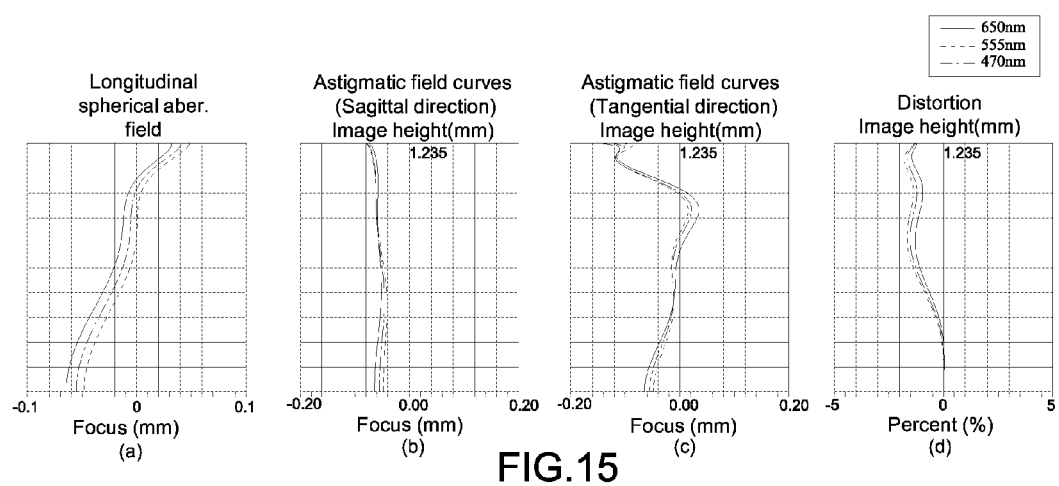
FIG. 15 is a chart of longitudinal spherical aberration and other kinds of optical aberrations of the fourth embodiment of the optical imaging lens according the present disclosures.

Reference is now made to FIGS. 14-17. FIG. 14 illustrates an example cross-sectional view of an optical imaging lens 4 having four lens elements of the optical imaging lens according to a fourth example embodiment. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment.

As shown in FIG. 14, the fourth embodiment is similar to the first embodiment. The optical imaging lens 4, in an order from an object side A1 to an image side A2, comprises an aperture stop 400, first lens element to fourth lens element 410-440. A filtering unit 450 and an image plane 460 of an image sensor are positioned at the image side A2 of the optical imaging lens 4. The arrangement of the convex or concave surface structures, including the object-side surfaces 411-441 and image-side surfaces 412-442, and the refractive power of the lens elements 410-440 are same with the optical imaging lens 1. More particularly, the image-side surface 412 of the first lens element 410 comprises a convex portion 4121 in a vicinity of the optical axis, and a convex portion 4122 in a vicinity of a periphery of the first lens element 410; the object-side surface 421 of the second lens element 420 comprises a concave portion 4212 in a vicinity of a periphery of the second lens element 420; the image-side surface 422 of the second lens element 420 comprises a convex portion 4222 in a vicinity of a periphery of the second lens element 420; the image-side surface 442 of the fourth lens element 440 comprises a concave portion 4421 in a vicinity of the optical axis, and a convex portion 4422 in a vicinity of a periphery of the fourth lens element 440. The difference between the optical imaging lens 1 and the optical imaging lens 4 is the image-side surface 432 of the third lens element 430 comprises a convex portion 4321 in a vicinity of the optical axis, and a concave portion 4322 in a vicinity of a periphery of the third lens element 430. Besides, the radius of curvature, the values of the central thicknesses of the lens elements 410-440 and the air gaps between the lens elements 410-440 are slight different from the values of the optical imaging lens 1.

Please refer to FIG. 16 for the optical characteristics of each lens elements in the optical imaging lens 4 of the present embodiment, wherein the values of $$\frac{G_{aa}}{G_{34}}, \frac{G_{12}}{BFL}, \frac{T_3}{G_{23}}, \frac{G_{23}}{BFL}, \frac{G_{23}}{T_1}, \text{ and } \frac{G_{aa}}{ALT}$$

are:

| | |
|---|---|
| $\frac{G_{aa}}{G_{34}} = 3.749,$ | satisfying Equation (1); |
| $\frac{G_{12}}{BFL} = 0.285,$ | satisfying Equation (2); |
| $\frac{T_3}{G_{23}} = 4.450,$ | satisfying Equation (3), and (3'); |
| $\frac{G_{23}}{BFL} = 0.143,$ | satisfying Equation (4), and (4'); |
| $\frac{G_{23}}{T_1} = 0.179,$ | satisfying Equation (5), and (5'); |
| $\frac{G_{aa}}{ALT} = 0.199,$ | satisfying Equation (6). |

Please note that, the back focal length of the optical imaging lens, BFL, is 0.545 mm. The sum of all air gaps from the first lens element 410 to the fourth lens element 440 along the optical axis, $G_{aa}$, is 0.318 mm. The distance from the object-side surface 411 of the first lens element 410 to the image plane 460 is 2.466 mm, and the length of the optical imaging lens 4 is indeed shortened.

As shown in FIGS. 15(a)-15(d), the optical imaging lens 4 of the present embodiment shows great characteristics in longitudinal spherical aberration 15(a), astigmatism in the sagittal direction 15(b), astigmatism in the tangential direction 15(c), and distortion aberration 15(d). Therefore, according to the above illustration, the optical imaging lens of the present embodiment indeed shows great optical performance and the length of the optical imaging lens 4 is effectively shortened.

Figure 18:
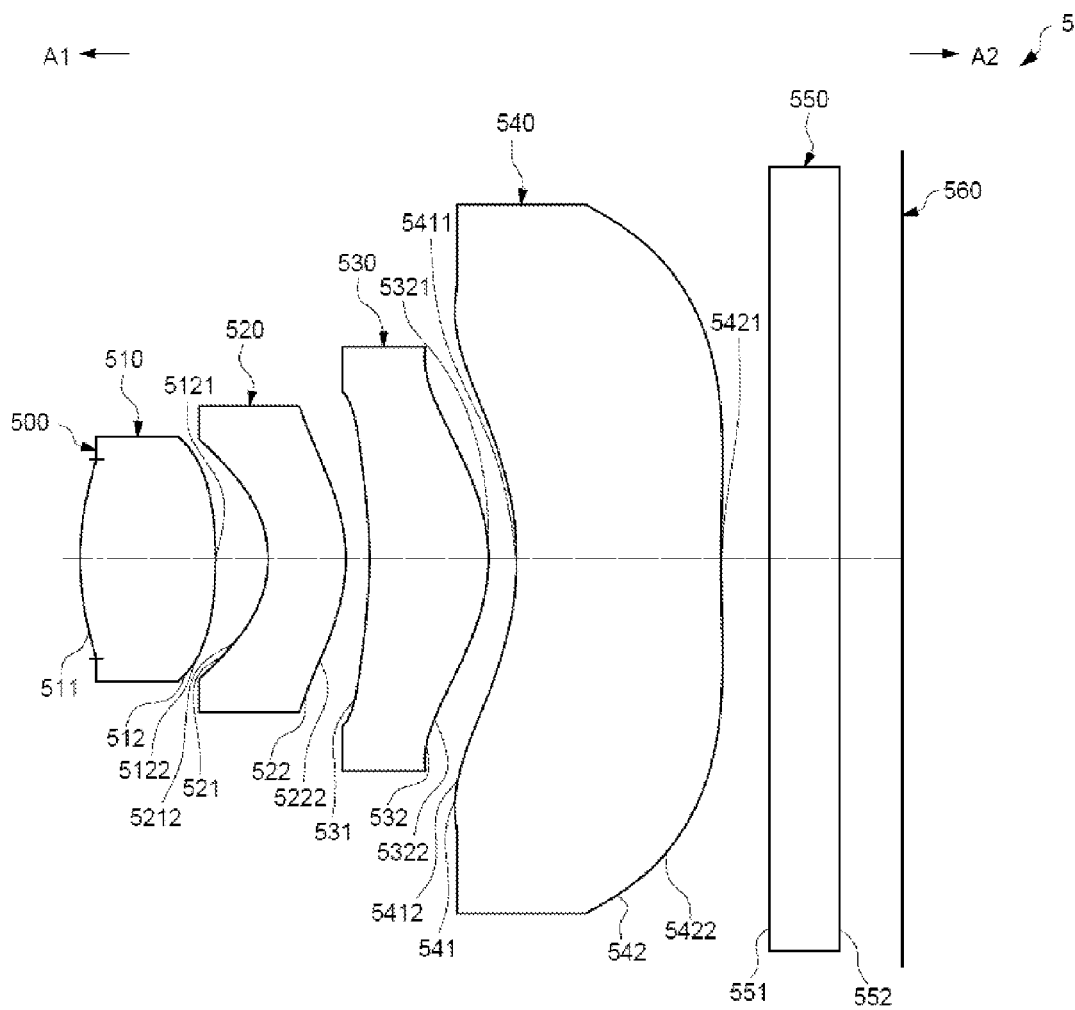
FIG. 18 is a cross-sectional view of a fifth embodiment of an optical imaging lens having four lens elements according to the present disclosures.
Figure 19:
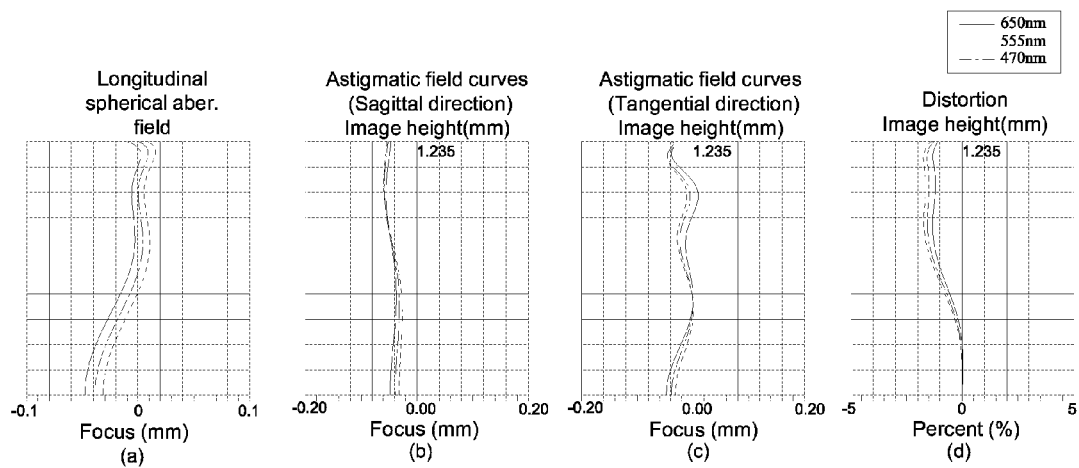
FIG. 19 is a chart of longitudinal spherical aberration and other kinds of optical aberrations of the fifth embodiment of the optical imaging lens according the present disclosures.

Reference is now made to FIGS. 18-21. FIG. 18 illustrates an example cross-sectional view of an optical imaging lens 5 having four lens elements of the optical imaging lens according to a fifth example embodiment. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment.

As shown in FIG. 18, the fifth embodiment is similar to the first embodiment. The optical imaging lens 5, in an order from an object side A1 to an image side A2, comprises an aperture stop 500, first lens element to fourth lens element 510-440. A filtering unit 550 and an image plane 560 of an image sensor are positioned at the image side A2 of the optical imaging lens 5. The arrangement of the convex or concave surface structures, including the object-side surfaces 511-541 and image-side surfaces 512-542, and the refractive power of the lens elements 510-540 are same with the optical imaging lens 1. More particularly, the image-side surface 512 of the first lens element 510 comprises a convex portion 5121 in a vicinity of the optical axis, and a convex portion 5122 in a vicinity of a periphery of the first lens element 510; the object-side surface 521 of the second lens element 520 comprises a concave portion 5212 in a vicinity of a periphery of the second lens element 520; the image-side surface 522 of the second lens element 520 comprises a convex portion 5222 in a vicinity of a periphery of the second lens element 520; the image-side surface 542 of the fourth lens element 540 comprises a concave portion 5421 in a vicinity of the optical axis, and a convex portion 5422 in a vicinity of a periphery of the fourth lens element 540. The difference between the optical imaging lens 1 and the optical imaging lens 5 is the image-side surface 532 of the third lens element 530 comprises a convex portion 5321 in a vicinity of the optical axis, and a concave portion 5322 in a vicinity of a periphery of the third lens element 530; and the object-side surface 541 of the fourth lens element 540 comprises a concave portion 5411 in a vicinity of the optical axis, and a convex portion 5412 in a vicinity of a periphery of the fourth lens element 540. Besides, the radius of curvature, the values of the central thicknesses of the lens elements 510-540 and the air gaps between the lens elements 510-540 are slight different from the values of the optical imaging lens 1.

Please refer to FIG. 20 for the optical characteristics of each lens elements in the optical imaging lens 5 of the present embodiment, wherein the values of $$\frac{G_{aa}}{G_{34}}, \frac{G_{12}}{BFL}, \frac{T_3}{G_{23}}, \frac{G_{23}}{BFL}, \frac{G_{23}}{T_1}, \text{ and } \frac{G_{aa}}{ALT}$$

are:

| | |
|---|---|
| $\frac{G_{aa}}{G_{34}} = 3.712,$ | satisfying Equation (1); |
| $\frac{G_{12}}{BFL} = 0.289,$ | satisfying Equation (2); |
| $\frac{T_3}{G_{23}} = 4.921,$ | satisfying Equations (3), and (3'); |
| $\frac{G_{23}}{BFL} = 0.133,$ | satisfying Equations (4), and (4'); |
| $\frac{G_{23}}{T_1} = 0.178,$ | satisfying Equations (5), (5'); |
| $\frac{G_{aa}}{ALT} = 0.196,$ | satisfying Equation (6). |

Please note that, the back focal length of the optical imaging lens, BFL, is 0.546 mm. The sum of all air gaps from the first lens element 510 to the fourth lens element 540 along the optical axis, $G_{aa}$, is 0.315 mm. The distance from the object-side surface 511 of the first lens element 510 to the image plane 560 is 2.471 mm, and the length of the optical imaging lens 5 is indeed shortened.

As shown in FIGS. 19(a)-19(d), the optical imaging lens 5 of the present embodiment shows great characteristics in longitudinal spherical aberration 19(a), astigmatism in the sagittal direction 19(b), astigmatism in the tangential direction 19(c), and distortion aberration 19(d). Therefore, according to the above illustration, the optical imaging lens of the present embodiment indeed shows great optical performance and the length of the optical imaging lens 5 is effectively shortened.

Figure 22:
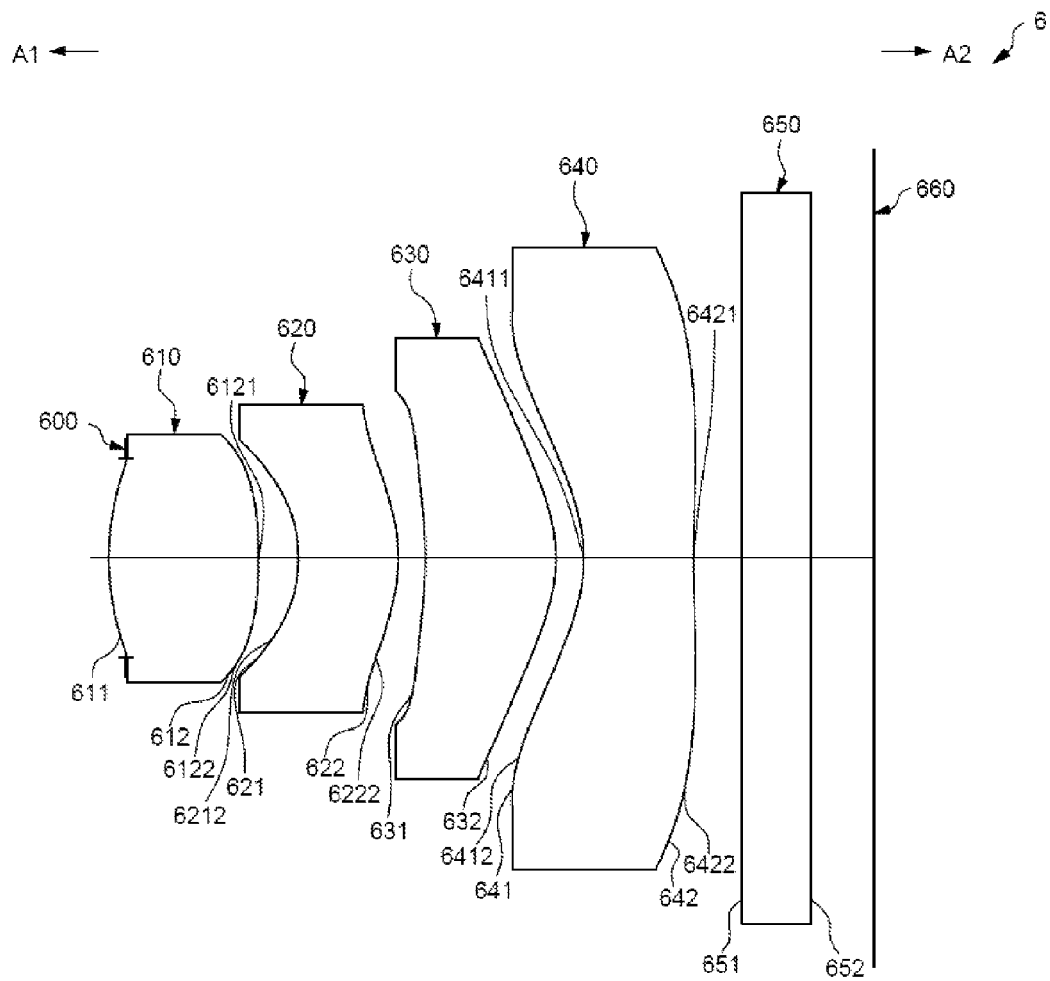
FIG. 22 is a cross-sectional view of a sixth embodiment of an optical imaging lens having four lens elements according to the present disclosures.
Figure 23:
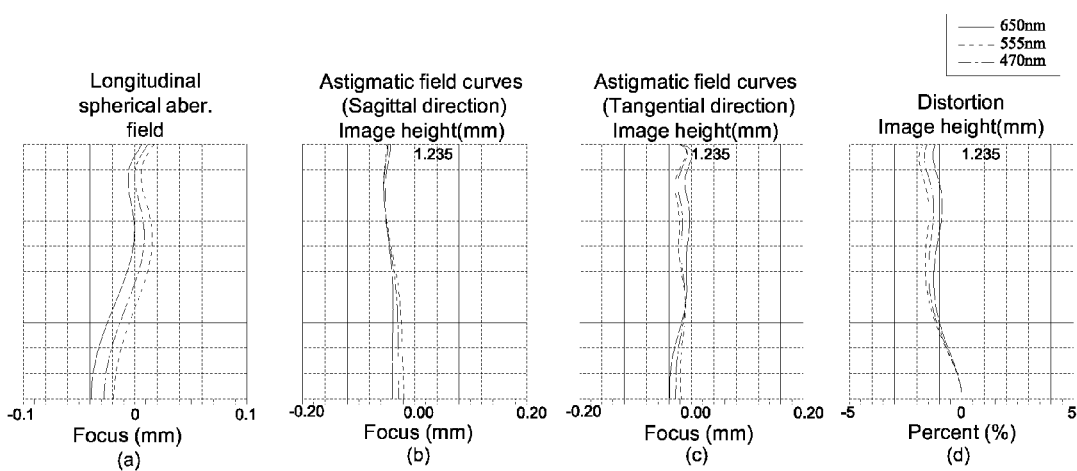
FIG. 23 is a chart of longitudinal spherical aberration and other kinds of optical aberrations of the sixth embodiment of the optical imaging lens according the present disclosures.

Reference is now made to FIGS. 22-25. FIG. 22 illustrates an example cross-sectional view of an optical imaging lens 6 having four lens elements of the optical imaging lens according to a sixth example embodiment. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment.

As shown in FIG. 22, the sixth embodiment is similar to the first embodiment. The optical imaging lens 6, in an order from an object side A1 to an image side A2, comprises an aperture stop 600, first lens element to fourth lens element 610-640. A filtering unit 650 and an image plane 660 of an image sensor are positioned at the image side A2 of the optical imaging lens 6. The arrangement of the convex or concave surface structures, including the object-side surfaces 611-641 and image-side surfaces 612-642, and the refractive power of the lens elements 610-640 are same with the optical imaging lens 1. More particularly, the image-side surface 612 of the first lens element 610 comprises a convex portion 6121 in a vicinity of the optical axis, and a convex portion 6122 in a vicinity of a periphery of the first lens element 610; the object-side surface 621 of the second lens element 620 comprises a concave portion 6212 in a vicinity of a periphery of the second lens element 620; the image-side surface 622 of the second lens element 620 comprises a convex portion 6222 in a vicinity of a periphery of the second lens element 620; the image-side surface 642 of the fourth lens element 640 comprises a concave portion 6421 in a vicinity of the optical axis, and a convex portion 6422 in a vicinity of a periphery of the fourth lens element 640. The difference between the optical imaging lens 1 and the optical imaging lens 6 is the object-side surface 641 of the fourth lens element 640 comprises a concave portion 6411 in a vicinity of the optical axis, and a convex portion 6412 in a vicinity of a periphery of the fourth lens element 640. Besides, the radius of curvature, the values of the central thicknesses of the lens elements 610-640 and the air gaps between the lens elements 610-640 are slight different from the values of the optical imaging lens 1.

Please refer to FIG. 24 for the optical characteristics of each lens elements in the optical imaging lens 6 of the present embodiment, wherein the values of $$\frac{G_{aa}}{G_{34}}, \frac{G_{12}}{BFL}, \frac{T_3}{G_{23}}, \frac{G_{23}}{BFL}, \frac{G_{23}}{T_1}, \frac{G_{aa}}{ALT}, \text{ and } \frac{T_4}{T_3}$$

are:

$\frac{G_{aa}}{G_{34}} = 3.380$, satisfying Equation (1);

$\frac{G_{12}}{BFL} = 0.222$, satisfying Equation (2);

$\frac{T_3}{G_{23}} = 4.904$, satisfying Equation (3), and (3');

$\frac{G_{23}}{BFL} = 0.148$, satisfying Equation (4), and (4');

$\frac{G_{23}}{T_1} = 0.178$, satisfying Equation (5), and (5');

$\frac{G_{aa}}{ALT} = 0.193$, satisfying Equation (6);

$\frac{T_4}{T_3} = 0.841$, satisfying Equation (7).

Please note that, the back focal length of the optical imaging lens, BFL, is 0.544 mm. The sum of all air gaps from the first lens element 610 to the fourth lens element 640 along the optical axis, $G_{aa}$, is 0.286 mm. The distance from the object-side surface 611 of the first lens element 610 to the image plane 660 is 2.311 mm, and the length of the optical imaging lens 6 is indeed shortened.

As shown in FIGS. 23(a)-23(d), the optical imaging lens 6 of the present embodiment shows great characteristics in longitudinal spherical aberration 23(a), astigmatism in the sagittal direction 23(b), astigmatism in the tangential direction 23(c), and distortion aberration 23(d). Therefore, according to the above illustration, the optical imaging lens of the present embodiment indeed shows great optical performance and the length of the optical imaging lens 6 is effectively shortened.

Figure 26:
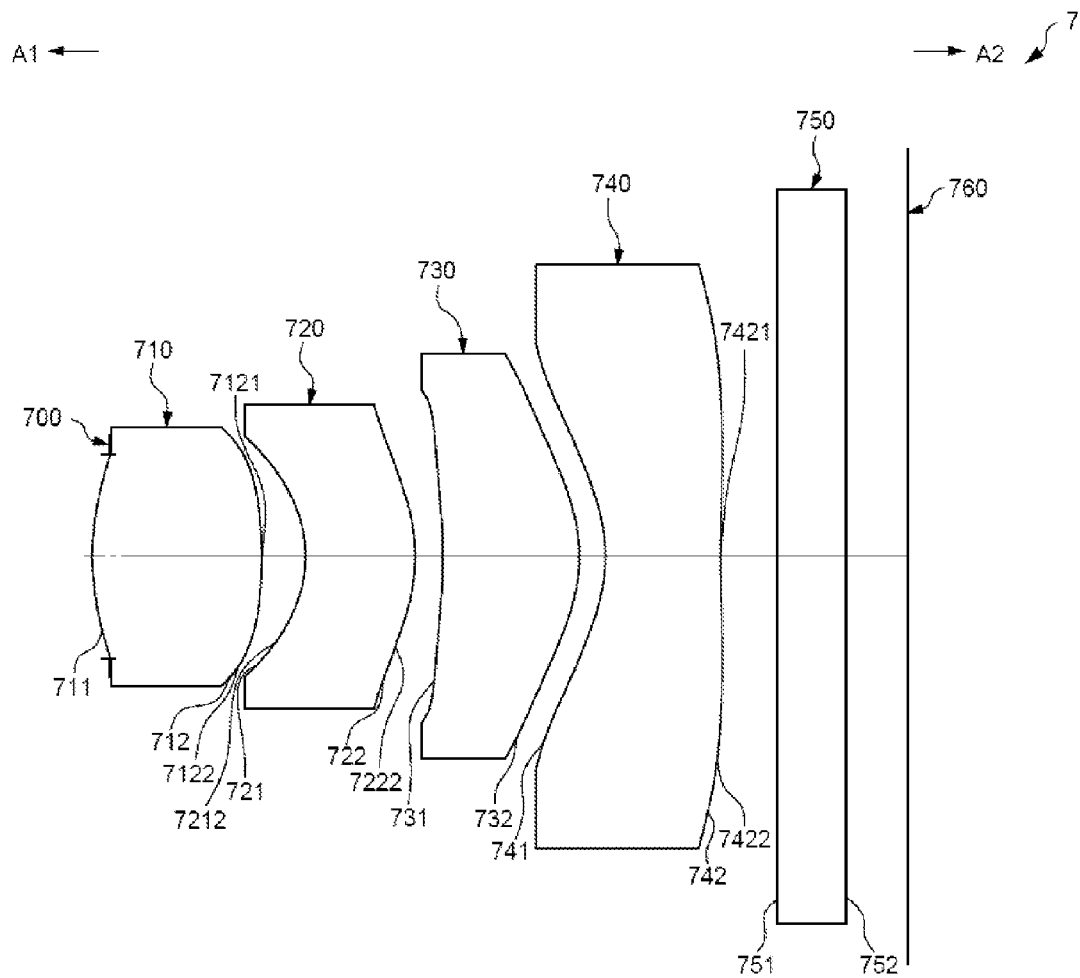
FIG. 26 is a cross-sectional view of a seventh embodiment of an optical imaging lens having four lens elements according to the present disclosures.
Figure 27:
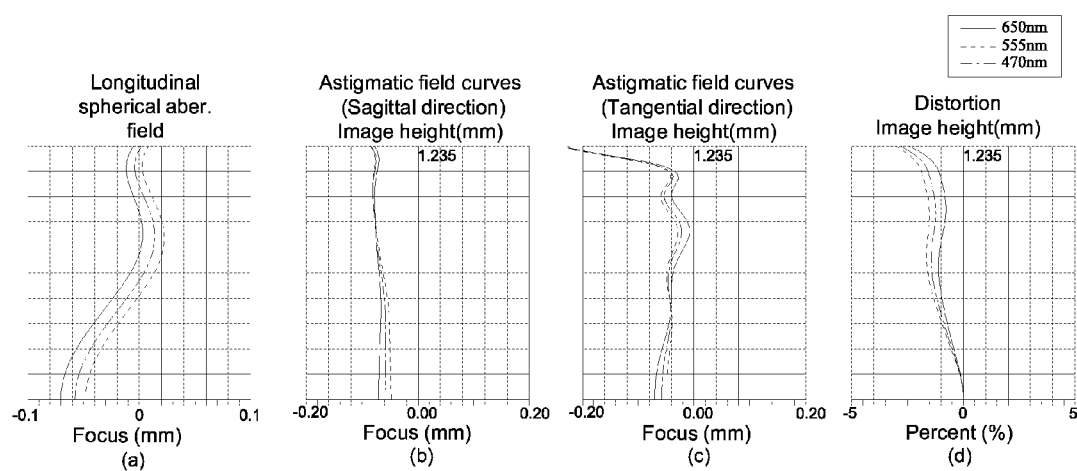
FIG. 27 is a chart of longitudinal spherical aberration and other kinds of optical aberrations of the seventh embodiment of the optical imaging lens according the present disclosures.

Reference is now made to FIGS. 26-29. FIG. 26 illustrates an example cross-sectional view of an optical imaging lens 7 having four lens elements of the optical imaging lens according to a seventh example embodiment. FIG. 27 shows example charts of longitudinal spherical aberration and other kinds of optical aberrations of the optical imaging lens 7 according to the seventh example embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment.

As shown in FIG. 26, the seventh embodiment is similar to the first embodiment. The optical imaging lens 7, in an order from an object side A1 to an image side A2, comprises an aperture stop 700, first lens element to fourth lens element 710-740. A filtering unit 750 and an image plane 760 of an image sensor are positioned at the image side A2 of the optical imaging lens 7. The arrangement of the convex or concave surface structures, including the object-side surfaces 711-741 and image-side surfaces 712-742, and the refractive power of the lens elements 710-740 are same with the optical imaging lens 1. More particularly, the image-side surface 712 of the first lens element 710 comprises a convex portion 7121 in a vicinity of the optical axis, and a convex portion 7122 in a vicinity of a periphery of the first lens element 710; the object-side surface 721 of the second lens element 720 comprises a concave portion 7212 in a vicinity of a periphery of the second lens element 720; the image-side surface 722 of the second lens element 720 comprises a convex portion 7222 in a vicinity of a periphery of the second lens element 720; the image-side surface 742 of the fourth lens element 740 comprises a concave portion 7421 in a vicinity of the optical axis, and a convex portion 7422 in a vicinity of a periphery of the fourth lens element 740. The difference between the optical imaging lens 1 and the optical imaging lens 7 is the radius of curvature, the values of the central thicknesses of the lens elements 710-740 and the air gaps between the lens elements 710-740 are slight different from the values of the optical imaging lens 1.

Please refer to FIG. 28 for the optical characteristics of each lens elements in the optical imaging lens 7 of the present embodiment, wherein the values of $$\frac{G_{aa}}{G_{34}}, \frac{G_{12}}{BFL}, \frac{T_3}{G_{23}}, \frac{G_{23}}{BFL}, \frac{G_{23}}{T_1}, \frac{G_{aa}}{ALT}, \text{ and } \frac{T_4}{T_3}$$

are:

$\frac{G_{aa}}{G_{34}} = 3.765$, satisfying Equation (1);

$\frac{G_{12}}{BFL} = 0.236$, satisfying Equation (2);

$\frac{T_3}{G_{23}} = 4.931$, satisfying Equation (3), and (3');

$\frac{G_{23}}{BFL} = 0.148$, satisfying Equation (4), and (4');

$\frac{G_{23}}{T_1} = 0.164$, satisfying Equation (5), and (5');

$\frac{G_{aa}}{ALT} = 0.185$, satisfying Equation (6);

$\frac{T_4}{T_3} = 0.843$, satisfying Equation (7).

Please note that, the back focal length of the optical imaging lens, BFL, is 0.571 mm. The sum of all air gaps from the first lens element 710 to the fourth lens element 740 along the optical axis, $G_{aa}$, is 0.299 mm. The distance from the object-side surface 711 of the first lens element 710 to the image plane 760 is 2.489 mm, and the length of the optical imaging lens 7 is indeed shortened.

As shown in FIGS. 27(*a*)-27(*d*), the optical imaging lens 7 of the present embodiment shows great characteristics in longitudinal spherical aberration 27(*a*), astigmatism in the sagittal direction 27(*b*), astigmatism in the tangential direction 27(*c*), and distortion aberration 27(*d*). Therefore, according to the above illustration, the optical imaging lens of the present embodiment indeed shows great optical performance and the length of the optical imaging lens 7 is effectively shortened.

Figure 30:
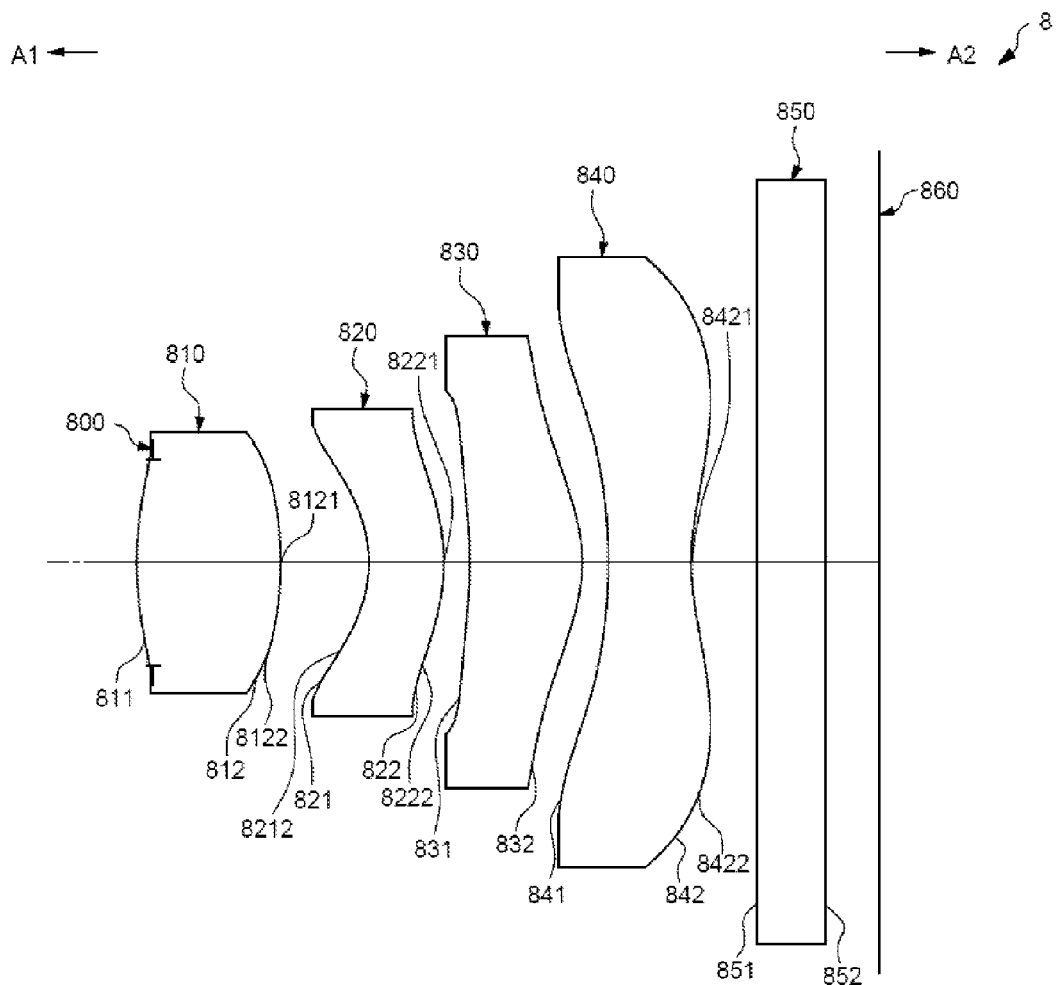
FIG. 30 is a cross-sectional view of a eighth embodiment of an optical imaging lens having four lens elements according to the present disclosures.
Figure 31:
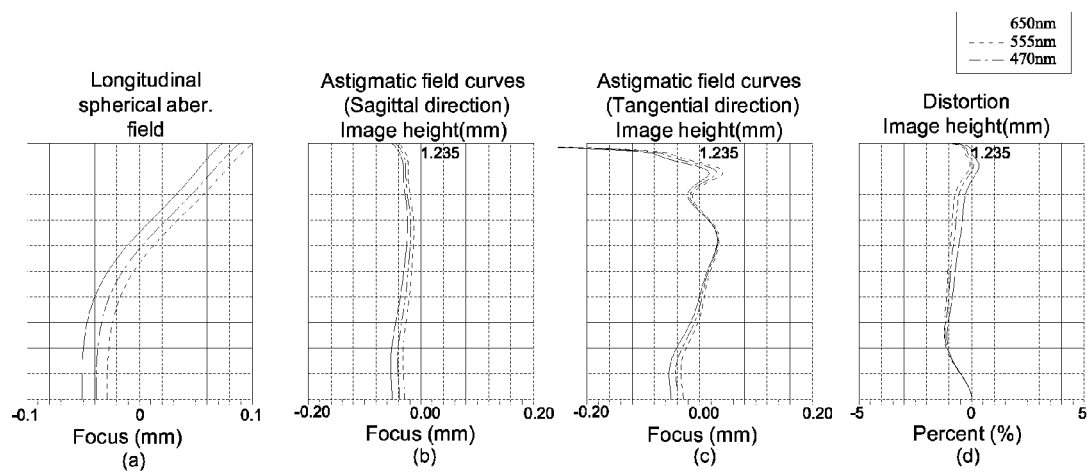
FIG. 31 is a chart of longitudinal spherical aberration and other kinds of optical aberrations of the eighth embodiment of the optical imaging lens according the present disclosures.

Reference is now made to FIGS. 30-33. FIG. 30 illustrates an example cross-sectional view of an optical imaging lens 8 having four lens elements of the optical imaging lens according to an eighth example embodiment. FIG. 31 shows example charts of longitudinal spherical aberration and other kinds of optical aberrations of the optical imaging lens 8 according to the eighth example embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment.

As shown in FIG. 30, the eighth embodiment is similar to the first embodiment. The optical imaging lens 8, in an order from an object side A1 to an image side A2, comprises an aperture stop 800, first lens element to fourth lens element 810-840. A filtering unit 850 and an image plane 860 of an image sensor are positioned at the image side A2 of the optical imaging lens 8. The arrangement of the convex or concave surface structures, including the object-side surfaces 811-841 and image-side surfaces 812-842, and the refractive power of the lens elements 810-840 are same with the optical imaging lens 1. More particularly, the image-side surface 812 of the first lens element 810 comprises a convex portion 8121 in a vicinity of the optical axis, and a convex portion 8122 in a vicinity of a periphery of the first lens element 810; the object-side surface 821 of the second lens element 820 comprises a concave portion 8212 in a vicinity of a periphery of the second lens element 820; the image-side surface 842 of the fourth lens element 840 comprises a concave portion 8421 in a vicinity of the optical axis, and a convex portion 8422 in a vicinity of a periphery of the fourth lens element 840. The difference between the optical imaging lens 1 and the optical imaging lens 8 is the image-side surface 822 of the second lens element 820 comprises a convex portion 8221 in a vicinity of the optical axis, and a concave portion 8222 in a vicinity of a periphery of the second lens element 820. Besides, the radius of curvature, the values of the central thicknesses of the lens elements 810-840 and the air gaps between the lens elements 810-840 are slight different from the values of the optical imaging lens 1.

Please refer to FIG. 32 for the optical characteristics of each lens elements in the optical imaging lens 8 of the present embodiment, wherein the values of $\frac{G_{aa}}{G_{34}}, \frac{T_3}{G_{23}}, \frac{G_{23}}{BFL}, \frac{G_{23}}{T_1}$, and $\frac{T_4}{T_3}$ are:

$\frac{G_{aa}}{G_{34}} = 5.341$, satisfying Equation (1);

$\frac{T_3}{G_{23}} = 4.342$, satisfying Equation (3), and (3');

$\frac{G_{23}}{BFL} = 0.138$, satisfying Equation (4), and (4');

$\frac{G_{23}}{T_1} = 0.180$, satisfying Equation (5), and (5');

$\frac{T_4}{T_3} = 0.734$, satisfying Equation (7).

Please note that, the back focal length of the optical imaging lens, BFL, is 0.568 mm. The sum of all air gaps from the first lens element 810 to the fourth lens element 840 along the optical axis, $G_{aa}$, is 0.425 mm. The distance from the object-side surface 811 of the first lens element 810 to the image plane 860 is 2.247 mm, and the length of the optical imaging lens 8 is indeed shortened.

As shown in FIGS. 31(*a*)-31(*d*), the optical imaging lens 8 of the present embodiment shows great characteristics in longitudinal spherical aberration 31(*a*), astigmatism in the sagittal direction 31(*b*), astigmatism in the tangential direction 31(*c*), and distortion aberration 31(*d*). Therefore, according to the above illustration, the optical imaging lens of the present embodiment indeed shows great optical performance and the length of the optical imaging lens 8 is effectively shortened.

Figure 34:
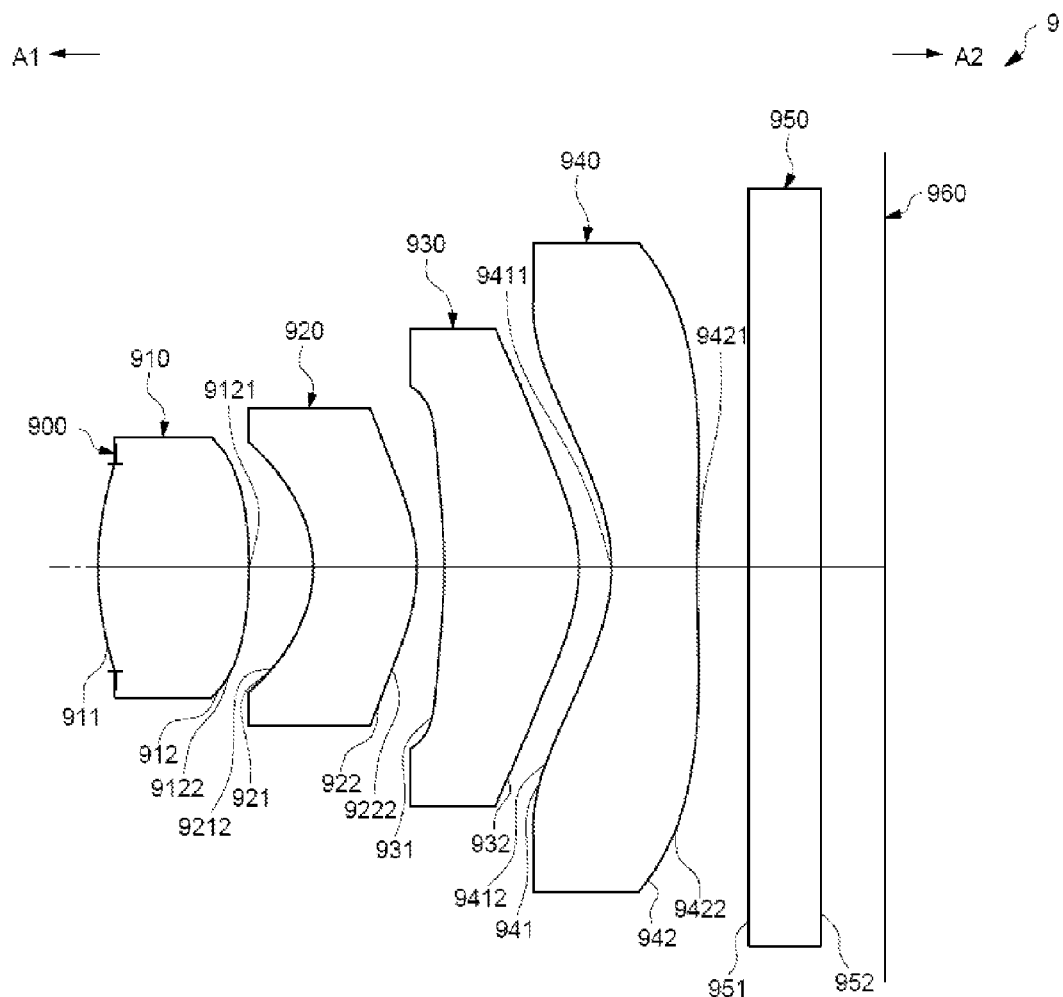
FIG. 34 is a cross-sectional view of a ninth embodiment of an optical imaging lens having four lens elements according to the present disclosures.
Figure 35:
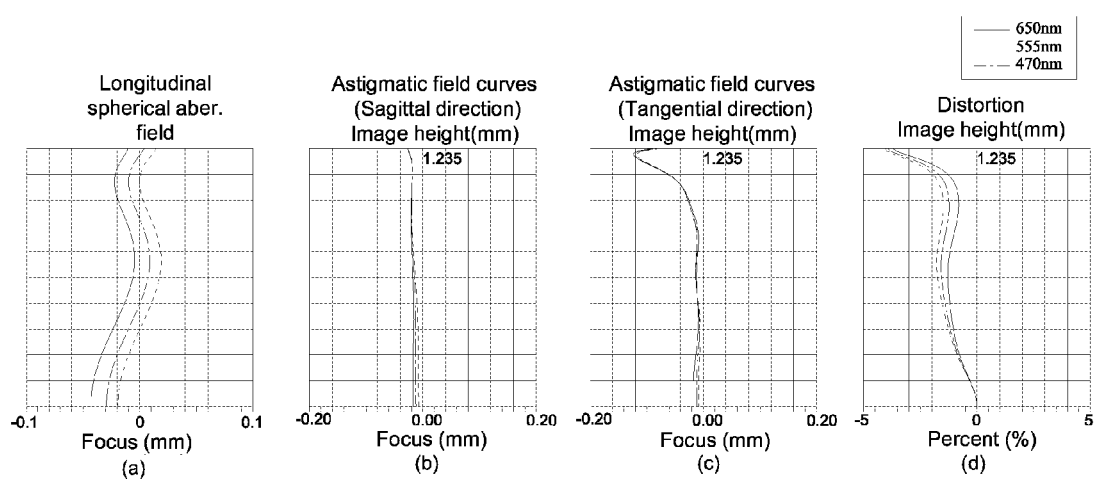
FIG. 35 is a chart of longitudinal spherical aberration and other kinds of optical aberrations of the ninth embodiment of the optical imaging lens according the present disclosures.

Reference is now made to FIGS. 34-37. FIG. 34 illustrates an example cross-sectional view of an optical imaging lens 9 having four lens elements of the optical imaging lens according to a ninth example embodiment. FIG. 35 shows example charts of longitudinal spherical aberration and other kinds of optical aberrations of the optical imaging lens 9 according to the ninth example embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment.

As shown in FIG. 34, the ninth embodiment is similar to the first embodiment. The optical imaging lens 9, in an order from an object side A1 to an image side A2, comprises an aperture stop 900, first lens element to fourth lens element 910-940. A filtering unit 950 and an image plane 960 of an image sensor are positioned at the image side A2 of the optical imaging lens 9. The arrangement of the convex or concave surface structures, including the object-side surfaces 911-941 and image-side surfaces 912-942, and the refractive power of the lens elements 910-940 are same with the optical imaging lens 1. More particularly, the image-side surface 912 of the first lens element 910 comprises a convex portion 9121 in a vicinity of the optical axis, and a convex portion 9122 in a vicinity of a periphery of the first lens element 910; the object-side surface 921 of the second lens element 920 comprises a concave portion 9212 in a vicinity of a periphery of the second lens element 920; the image-side surface 942 of the fourth lens element 940 comprises a concave portion 9421 in a vicinity of the optical axis, and a convex portion 9422 in a vicinity of a periphery of the fourth lens element 940. The difference between the optical imaging lens 1 and the optical imaging lens 9 is the object-side surface 941 of the fourth lens element 940 comprises a concave portion 9411 in a vicinity of the optical axis, and a convex portion 9412 in a vicinity of a periphery of the fourth lens element 940. Besides, the radius of curvature, the values of the central thicknesses of the lens elements 910-940 and the air gaps between the lens elements 910-940 are slight different from the values of the optical imaging lens 1.

Please refer to FIG. 36 for the optical characteristics of each lens elements in the optical imaging lens 9 of the present embodiment, wherein the values of $$\frac{G_{aa}}{G_{34}}, \frac{G_{12}}{BFL}, \frac{T_3}{G_{23}}, \frac{G_{23}}{BFL}, \frac{G_{23}}{T_1}, \frac{G_{aa}}{ALT}, \text{ and } \frac{T_4}{T_3}$$

are:

$\frac{G_{aa}}{G_{34}} = 3.799$, satisfying Equation (1);

$\frac{T_3}{G_{23}} = 4.909$, satisfying Equations (3), and (3');

$\frac{G_{23}}{BFL} = 0.146$, satisfying Equations (4), and (4');

$\frac{G_{aa}}{ALT} = 0.261$, satisfying Equation (6);

$\frac{T_4}{T_3} = 0.632$, satisfying Equation (7).

Please note that, the back focal length of the optical imaging lens, BFL, is 0.552 mm. The sum of all air gaps from the first lens element 910 to the fourth lens element 940 along the optical axis, $G_{aa}$, is 0.363 mm. The distance from the object-side surface 911 of the first lens element 910 to the image plane 960 is 2.307 mm, and the length of the optical imaging lens 8 is indeed shortened.

As shown in FIGS. 35(a)-35(d), the optical imaging lens 9 of the present embodiment shows great characteristics in longitudinal spherical aberration 35(a), astigmatism in the sagittal direction 35(b), astigmatism in the tangential direction 35(c), and distortion aberration 35(d). Therefore, according to the above illustration, the optical imaging lens of the present embodiment indeed shows great optical performance and the length of the optical imaging lens 9 is effectively shortened.

Please refer to FIG. 38, which shows the values of $$\frac{G_{aa}}{G_{34}}, \frac{G_{12}}{BFL}, \frac{T_3}{G_{23}}, \frac{G_{23}}{BFL}, \frac{G_{23}}{T_1}, \frac{G_{aa}}{ALT}, \text{ and } \frac{T_4}{T_3}$$

of all nine embodiments, and it is clear that the optical imaging lens of the present invention satisfy the Equations (1), (2), (3) and/or (3'), (4) and/or (4'), (5) and/or (5'), (6), or (7).

Please refer to FIG. 39, which shows an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 39, the photography module 22 may comprise an aforesaid optical imaging lens with fourth lens elements, for example the optical imaging lens 1 of the first embodiment, a lens barrel 23 for positioning the optical imaging lens 1, a module housing unit 24 for positioning the lens barrel 23, a substrate 162 for positioning the module housing unit 24, and an image sensor 161 which is positioned at an image side of the optical imaging lens 1. The image plane 160 is formed on the image sensor 161.

In some other example embodiments, the structure of the filtering unit 150 may be omitted. In some example embodiments, the housing 21, the lens barrel 23, and/or the module housing unit 24 may be integrated into a single component or assembled by multiple components. In some example embodiments, the image sensor 161 used in the present embodiment is directly attached to a substrate 162 in the form of a chip on board (COB) package, and such package is different from traditional chip scale packages (CSP) since COB package does not require a cover glass before the image sensor 161 in the optical imaging lens 1. Aforesaid exemplary embodiments are not limited to this package type and could be selectively incorporated in other described embodiments.

The fourth lens elements 110, 120, 130, 140 are positioned in the lens barrel 23 in the way of separated by an air gap between any two adjacent lens elements.

The module housing unit 24 comprises a seat element 2401 for positioning the lens barrel 23 and an image sensor backseat 2406, in which the image sensor backseat 2406 is not necessary in other embodiment. The lens barrel 23 and the seat element 2401 are positioned along a same axis I-I', and the lens barrel 23 is positioned inside the seat element 2401.

Because the length of the optical imaging lens 1 is merely 2.345 (mm), the size of the mobile device 20 may be quite small. Therefore, the embodiments described herein meet the market demand for smaller sized product designs.

Reference is now made to FIG. 40, which shows another structural view of a second embodiment of mobile device 20' applying the aforesaid optical imaging lens 1. One difference between the mobile device 20' and the mobile device 20 may be the seat element 2401 further comprises a first lens seat 2402, a second lens seat 2403, a coil 2404, and a magnetic unit 2405. The first lens seat 2402, which is close to the outside of the lens barrel 23, and the lens barrel 23 are positioned along an axis II'. The second lens seat 2403 is positioned along the axis II' and around the outside of the first lens seat 2402. The coil 2404 is positioned between the outside of the first lens seat 2402 and the inside of the second lens seat 2403. The magnetic unit 2405 is positioned between the outside of the coil 2404 and the inside of the second lens seat 2403. The end facing to the image side of the image sensor backseat 2406 is close to the second lens seat 2403.

The lens barrel 23 and the optical imaging lens 1 positioned therein are driven by the first lens seat 2402 to move along the axis II'. The rest structure of the mobile device 20' is similar to the mobile device 20.

Similarly, because the length of the optical imaging lens 1, 2.345 mm, is shortened, the mobile device 20' may be designed with a smaller size and meanwhile good optical performance is still provided. Therefore, the present embodiment meets the market demand for smaller sized product designs, and maintains good optical characteristics and image quality. Accordingly, the present embodiment not only reduces raw material amount of housing for economic benefits, but also meets smaller sized product design trend and consumer demand.

According to above illustration, it is clear that the mobile device and the optical imaging lens thereof in example embodiments, through controlling ratio of at least one central thickness of lens element to a sum of all air gaps along the optical axis between four lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side, comprising an aperture stop, first, second, third, and fourth lens elements, each of said lens elements having an object-side surface facing toward the object side and an image-side surface facing toward the image side, wherein:

said first lens element has a positive refractive power, and said object-side surface of said first lens element comprises a convex surface;

said second lens element has a negative refractive power, said object-side surface of said second lens element comprises a concave portion in a vicinity of a periphery of the second lens element, and said image-side surface of said second lens element comprises a convex portion in a vicinity of a periphery of the second lens element;

said object-side surface of said fourth lens element is a concave surface in a vicinity of an optical axis, and said image-side surface of said fourth lens element comprises a concave portion in a vicinity of the optical axis and a convex portion in a vicinity of a periphery of the fourth lens element;

said optical imaging lens as a whole having only the four lens elements having refractive power, wherein the sum of all air gaps from the first lens element to the fourth lens element along the optical axis is $G_{aa}$, an air gap between the third lens element and the fourth lens element along the optical axis is $G_{34}$, and $G_{aa}$ and $G_{34}$ satisfy the equation:

$$\frac{G_{aa}}{G_{34}} \leq 6.0;$$

wherein a distance from said image-side surface of the fourth lens element to an image plane along the optical axis is defined as a back focal length of the optical imaging lens (BFL), an air gap between the first lens element and the second lens element along the optical axis is $G_{12}$, and BFL and $G_{12}$ satisfy the equation:

$$\frac{G_{12}}{BFL} \leq 0.3;$$

wherein an air gap between the second lens element and the third lens element along the optical axis is $G_{23}$, a central thickness of the first lens element along the optical axis is $T_1$, and $G_{23}$ and $T_1$ satisfy the equation:

$$\frac{G_{23}}{T_1} \leq 0.18; \text{ and}$$

wherein the sum of the thickness of all four lens elements along the optical axis is defined as ALT, and ALT and $G_{aa}$ satisfy the equation:

$$\frac{G_{aa}}{ALT} \leq 0.29.$$

2. The optical imaging lens according to claim 1, wherein said image-side surface of the first lens element has a convex portion in a vicinity of a periphery of the first lens element.

3. The optical imaging lens according to claim 2, wherein a central thickness of the third lens element along the optical axis is $T_3$, an air gap between the second lens element and the third lens element along the optical axis is $G_{23}$, and $T_3$ and $G_{23}$ satisfy the equation:

$$\frac{T_3}{G_{23}} \leq 5.0.$$

4. The optical imaging lens according to claim 3, wherein $G_{23}$ and BFL satisfy the equation:

$$\frac{G_{23}}{BFL} \leq 0.15.$$

5. The optical imaging lens according to claim 1, wherein a central thickness of the third lens element along the optical axis is $T_3$, and $T_3$ and $G_{23}$ satisfy the equation:

$$\frac{T_3}{G_{23}} \leq 5.0.$$

6. The optical imaging lens according to claim 1, wherein a central thickness of the third lens element along the optical axis is $T_3$, a central thickness of the fourth lens element along the optical axis is $T_4$, and $T_3$ and $T_4$ satisfy the equation:

$$\frac{T_4}{T_3} \leq 0.85.$$

7. The optical imaging lens according to claim 6, wherein said image-side surface of the first lens element has a convex portion in a vicinity of the optical axis.

8. The optical imaging lens according to claim 6, wherein an air gap between the second lens element and the third lens element along the optical axis is $G_{23}$, a central thickness of the first lens element along the optical axis is $T_1$, and $G_{23}$ and $T_1$ satisfies the equation:

$$0.15 \leq \frac{G_{23}}{T_1} \leq 0.18.$$

9. The optical imaging lens according to claim 6, wherein an air gap between the second lens element and the third lens element along the optical axis is $G_{23}$, a distance from said image-side surface of the fourth lens element to an image plane along the optical axis is defined as a back focal length of the optical imaging lens (BFL), and $G_{23}$ and BFL satisfy the equation:

$$0.10 \leq \frac{G_{23}}{BFL} \leq 0.15.$$

10. The optical imaging lens according to claim 6, wherein said image-side surface of the first lens element has a convex portion in a vicinity of a periphery of the first lens element.

11. The optical imaging lens according to claim 10, a central thickness of the third lens element along the optical axis is $T_3$, an air gap between the second lens element and the third lens element along the optical axis is $G_{23}$, and $T_3$ and $G_{23}$ satisfy the equation:

$$1.5 \leq \frac{T_3}{G_{23}} \leq 5.0.$$

12. A mobile device, comprising:
a housing; and
a photography module positioned in the housing and comprising:
a lens barrel;
an optical imaging lens as claimed in claim 1 and positioned in the barrel;
a module housing unit for positioning the lens barrel;
a substrate for positioning the module housing unit; and
an image sensor positioned on the substrate and at the image side of the optical imaging lens.

13. The mobile device according to claim 12, wherein the module housing unit comprises a lens backseat, the lens backseat comprises a first lens seat and a second lens seat, the first lens seat is positioned close to the outside of the lens barrel and along with an axis, the second lens seat is positioned along the axis and around the outside of the first lens seat, and the lens barrel and the optical imaging lens positioned therein are driven by the first lens seat to move along the axis.

14. The mobile device according to claim 12, wherein the module housing unit further comprises an image sensor backseat positioned between the second lens seat and the image sensor, and close to the second lens seat.

\* \* \* \* \*